(12) United States Patent
Holst et al.

(10) Patent No.: US 12,161,132 B2
(45) Date of Patent: Dec. 10, 2024

(54) PROCESS FOR PRODUCTION OF IMPROVED NUTRITIONAL PRODUCTS CONTAINING MILK PROTEIN AND MILK SACCHARIDES, AND PRODUCTS OBTAINED BY THE PROCESS

(71) Applicant: Arla Foods Amba, Viby J (DK)

(72) Inventors: Hans Henrik Holst, Videbæk (DK); Kristian Albertsen, Videbæk (DK)

(73) Assignee: ARLA FOODS AMBA, Viby J (DK)

( * ) Notice: Subject to any disclaimer, the term of this patent is extended or adjusted under 35 U.S.C. 154(b) by 734 days.

(21) Appl. No.: 16/310,739

(22) PCT Filed: Jun. 21, 2017

(86) PCT No.: PCT/EP2017/065315
§ 371 (c)(1),
(2) Date: Dec. 17, 2018

(87) PCT Pub. No.: WO2017/220697
PCT Pub. Date: Dec. 28, 2017

(65) Prior Publication Data
US 2019/0320672 A1    Oct. 24, 2019

(30) Foreign Application Priority Data
Jun. 21, 2016 (EP) .................................. 16175594

(51) Int. Cl.
| | | |
|---|---|---|
| A23C 9/142 | (2006.01) |
| A23C 9/144 | (2006.01) |
| A23C 9/15 | (2006.01) |
| A23C 9/16 | (2006.01) |
| A23L 33/00 | (2016.01) |
| A23L 33/19 | (2016.01) |
| B01D 61/02 | (2006.01) |
| B01D 61/14 | (2006.01) |
| B01D 61/42 | (2006.01) |
| B01D 61/58 | (2006.01) |
| B01D 69/02 | (2006.01) |

(52) U.S. Cl.
CPC .......... *A23C 9/1422* (2013.01); *A23C 9/1427* (2013.01); *A23C 9/144* (2013.01); *A23C 9/1512* (2013.01); *A23C 9/16* (2013.01); *A23L 33/19* (2016.08); *A23L 33/40* (2016.08); *B01D 61/149* (2022.08); *B01D 61/422* (2013.01); *A23C 2210/206* (2013.01); *A23C 2210/252* (2013.01); *A23V 2002/00* (2013.01); *B01D 61/027* (2013.01); *B01D 61/145* (2013.01); *B01D 61/147* (2013.01); *B01D 61/58* (2013.01); *B01D 69/02* (2013.01); *B01D 2315/16* (2013.01); *B01D 2325/20* (2013.01); *B01D 2325/42* (2013.01)

(58) Field of Classification Search
CPC ..... A23C 9/1422; A23C 9/1427; A23C 9/144; A23C 9/1512; A23L 33/40
See application file for complete search history.

(56) References Cited

U.S. PATENT DOCUMENTS

| | | | | |
|---|---|---|---|---|
| 6,383,540 B1 * | 5/2002 | Noel | ................... | A23C 9/144 |
| | | | | 210/651 |
| 2009/0017176 A1 * | 1/2009 | Sugawara | ............... | A23C 3/02 |
| | | | | 426/271 |
| 2014/0302219 A1 * | 10/2014 | Tikanmaki | .......... | A23C 9/1422 |
| | | | | 426/580 |
| 2016/0044933 A1 | 2/2016 | Tobin et al. | | |

FOREIGN PATENT DOCUMENTS

| | | | |
|---|---|---|---|
| FR | 2809595 A1 | | 12/2001 |
| JP | H02261343 A | | 10/1990 |
| JP | 2009514511 A | | 4/2009 |
| JP | 2013165730 A | | 8/2013 |
| JP | 2014520548 A | | 8/2014 |
| NZ | 511562 A | * | 10/2003 |
| NZ | 580380 A | | 12/2012 |
| WO | WO00/30461 | * | 6/2000 |
| WO | WO 2006/135983 A1 | | 12/2006 |
| WO | 2007051475 A1 | | 5/2007 |
| WO | 2008101449 A1 | | 8/2008 |
| WO | 2008127104 A1 | | 10/2008 |
| WO | WO 2012010699 A1 | | 1/2012 |
| WO | 2012107865 A2 | | 8/2012 |
| WO | 2013009182 A1 | | 1/2013 |
| WO | WO 2013068653 A2 | | 5/2013 |

(Continued)

OTHER PUBLICATIONS

Simova, H., Kysela, V., and Cernin, A., "Demineralization of natural sweet whey by electrodialysis at pilot-plant scale," Abstract, Desalination and Water Treatment, vol. 14, p. 170-173, published online Aug. 3, 2012 (Year: 2012).*
AVP Systems "Membrane Filtration and related molecular separation technologies." Copyright 2000 by APV Systems, Silkeborg Denmark.
Burrington, "Milk Fractionation Technology and Emerging Milk Protein Opportunities." Dairy Research Institute, Jan. 1, 2013, pp. 1-8, retrieved from the internet Jul. 13, 2017.

(Continued)

*Primary Examiner* — Jeffrey P Mornhinweg
(74) *Attorney, Agent, or Firm* — Lisa Mueller; Casimir Jones SC

(57) ABSTRACT

The present invention pertains to an improved process for production of nutritional products, such as e.g. infant formulas, containing milk protein and milk saccharide. The invention is particularly useful for the production of demineralized nutritional products and provides both the final nutritional product as well as milk saccharide-containing milk protein serum ingredients useful for the production of such nutritional products.

14 Claims, 2 Drawing Sheets

(56) References Cited

FOREIGN PATENT DOCUMENTS

| WO | WO 2013137714 A1 | 9/2013 |
|---|---|---|
| WO | 2014163485 A1 | 10/2014 |
| WO | WO 2015041515 | 3/2015 |

OTHER PUBLICATIONS

Anonymous, "Commission Directive 2006/141/EC of Dec. 22, 2006", Official Journal of the European Union, vol. L401, Dec. 30, 2006, pp. 1-33.

Fairweather-Tait et al., "Iron and Calcium Bioavailability of Fortified Foods and Dietary Supplements." Nutrition Reviews, Nov. 2002, 60(12): 360-367.

Glahn et al. "Decreased citrate improves iron availability from infant formula: application of an in vitro digestion/Caco-2 cell culture model." J Nutr. Feb. 1998;128(2):257-64.

Martin-Sosa et al., "Sialyloligosaccharides in Human and Bovine Milk and in Infant Formulas: Variations with the Progression of Lactation." J. Dairy Sci., American Dairy Science Association, 2003, 86:52-59.

Tanaka, "Electrodialysis" in "Ion Exchange Membrans: Fundamentals and Applications", Jan. 20, 2015, Elsevier, pp. 255-293.

International Search Report and Written Opinion mailed Jul. 25, 2017, International Application No. PCT/EP2017/065315, 17 pages.

Gosta Bylund et al., "Dairy Processing Handbook", 2015, Tetra Pak Processing Systems AB, Lund, Sweden, Chapter 15, pp. 383-385.

Tanaka, "Ion Exchange Membranes Fundamentals and Applications", 2015, Elsevier, Amsterdam, Netherlands; Chapter 2, pp. 29-43; Chapter 12, pp. 284-289.

Guo, "Chemical composition of human milk." In: "Human Milk Biochemistry and Infant Formula Manufacturing Technology", Aug. 2, 2014, p. 19-32.

Cregan et al. "Initiation of lactation in women after preterm delivery." Acta Obstet Gynecol Scand 2002, 81:870-877.

Extended European Search Report dated Apr. 30, 2020, European Application No. 20163588.5, 18 pages.

Pierre Schuck, "Spray drying of dairy products: state of the art", EDP Sciences, pp. 375-382, Jul. 1, 2002.

Feng Biao, "Engineering and Application of Membrane Separation", p. 191, China Light Industry Press, Feb. 28, 2006.

Heinrich Strathmann, "Introduction to Membrane Science and Technology," Published by Wiley-VCH Verlag GmbH & Co. KGaA, Germany, copyright 2011, 1st reprint 2013, pp. 223-278.

Zhao Kuixia, "Water Treatment Engineering, 2nd Edition", p. 106, China Environmental Science Press, Aug. 31, 2008.

* cited by examiner

PROCESS FOR PRODUCTION OF IMPROVED NUTRITIONAL PRODUCTS CONTAINING MILK PROTEIN AND MILK SACCHARIDES, AND PRODUCTS OBTAINED BY THE PROCESS

CROSS-REFERENCE TO RELATED APPLICATIONS

This application is a National Stage entry under 35 U.S.C. § 371 of International Application No. PCT/EP2017/065315, filed on Jun. 21, 2017, which claims priority to European Patent Application No. 16175594.7, filed on Jun. 21, 2016, each of which are hereby incorporated by reference in its entirety.

FIELD OF THE INVENTION

The present invention pertains to an improved process for production of nutritional products, such as e.g. infant formulas, containing milk protein and milk saccharide. The invention is particularly useful for the production of demineralized nutritional products and provides both the final nutritional product as well as milk saccharide-containing milk protein serum ingredients useful for the production of such nutritional products.

BACKGROUND

Microfiltration (MF) has been recognized as an efficient tool for fractionation of milk protein, more specifically separation of micellar casein and milk serum protein, which can be recombined to form nutritional products having an optimized amino acid profile. Examples of such nutritional products are e.g. infant formulas (optimized for infants that are between 0-6 months old), follow-on formulas (optimized for infants that are between 6-12 months old), and growing up formulas (optimized for babies that are 12+ months old) or products for clinical nutrition.

WO 2013/068653 discloses a method of fractionating skimmed milk using the combination of: 1) MF of skimmed milk; 2) ultrafiltration (UF) of the MF permeate; 3) nanofiltration (NF) of the UF permeate, and 4) recombination of the UF retentate (serum protein) and the NF retentate (lactose) and other ingredients to form an infant formula product.

WO 2013/137714 discloses a similar method using the combination of 1) MF of skimmed milk using a volume concentration factor of 4-8; 2) ultrafiltration (UF) of the MF permeate using a volume concentration factor of 3-7; and 3) combining the MF retentate and the UF retentate, whereby a composition having a casein/whey weight ratio of 30/70-50/50 is obtained.

FR2809595 discloses a milk derivative comprising the following constituents: total proteins 10-80%, mineral matters 1-5%, sodium 0.02-0.4%, potassium 0.1-1.5%, threonine less than 6 g per 100 g of total aminoacids and tryptophan at least 1.8 g per 100 g of aminoacids. The milk derivative is produced by a method comprising: (a) obtaining soluble phase of milk; (b) selective demineralization of soluble phase by nanofiltration; and (c) obtaining milk derivative from deposit separated by nanofiltration.

US 2016/044933 A1 pertains to a process for treating animal skim milk and sweet whey and/or acid whey, comprising the following steps (a), (b) and (c). Step (a) consists of ultrafiltration (UF1) of a first liquid composition comprising animal skim milk with 70-90 wt % casein and 10-30 wt % whey proteins, based on total protein, over a first ultrafiltration membrane having a molecular weight cut-off of 2.5-25 kDa using a volume concentration factor of 1.5-6 to obtain a retentate (UFR1) and a permeate (UFP1). Step (b) consists of ultrafiltration (UF2) of a second liquid composition comprising sweet whey and/or acid whey over a second ultrafiltration membrane having a molecular weight cut-off of 2.5-25 kDa using a volume concentration factor of 2-15 to obtain a retentate (UFR2) and a permeate (UFP2). Step (c) consists of mixing the UF retentate originating from step (a) with the UF retentate originating from step (b) to obtain a mixture of UF retentates.

SUMMARY OF THE INVENTION

The present inventors have seen indications that prior art infant formula bases, e.g. those of WO 2013/068653 and WO 2013/137714, provide unintended variations in the bioavailability of minerals which are provided in the form of di- or trivalent metal ions.

The inventors have found that the content of citrate of the prior art infant formula bases of WO 2013/068653 and WO 2013/137714 is high and furthermore subject to significant variation, e.g. due to the impact of seasonal variations, general stage of lactation, and variation in the type of feed provided to the cows.

The inventors have furthermore realized that the variation in citrate is a problem when formulating the final infant formulas which are supposed to be nutritionally complete and to provide the infants with well-defined and highly controlled amounts of macro nutrients (protein, fat and carbohydrate) and micro nutrients (e.g. vitamins and minerals).

The concentration of citrate in infant formulas has been documented to affect the bioavailability of important minerals, such as e.g. iron, calcium, magnesium, and zinc (see e.g. Glahn et al and Fairweather-Tait et al). Variation in the amount of citrate of infant formula products will therefore result in unintended variations in the bioavailability of minerals which are provided in the form of di- or trivalent metal ions.

The inventors have found that the problem may be solved by using electrodialysis (ED) for the removal of polyvalent ions, and preferably ED configured to remove both mono-, di- and trivalent anions.

Thus, an aspect of the invention pertains to a method of producing a nutritional product, the method comprising the steps of:
a) providing a milk feed,
b) subjecting the milk feed to microfiltration (MF) or microfiltration/diafiltration, thereby providing an MF retentate enriched with respect to micellar casein and an MF permeate enriched with respect to serum protein,
c) subjecting the MF permeate to nanofiltration (NF) or nanofiltration/diafiltration using a membrane that allows for the passage of monovalent ions but retains milk saccharide so as to obtain an NF retentate and an NF permeate,
d) subjecting the NF retentate to electrodialysis so as to obtain a demineralised, milk saccharide-containing milk serum protein product which has a reduced level of calcium, magnesium and phosphorus,
e) adding a casein source, and optionally one or more additional ingredients, to the demineralised, milk saccharide-containing milk serum protein product to obtain the nutritional product, and f) optionally converting the nutritional product to a powder.

The present inventors have furthermore found that the above method simplifies the production of the nutritional product and/or the demineralised, milk saccharide-containing milk serum protein product of step d) significantly while still achieving a level of mineral reduction, which is required for e.g. infant formula products. Particularly, the present invention does not require the use of ultrafiltration of the milk serum protein-containing streams following step b) and performs the demineralisation directly in milk serum protein-containing streams.

Yet an advantage of the present method is that it utilizes a very high level of the milk serum protein and milk saccharide of the milk feed and a very high proportion of both the milk serum protein and the milk saccharide end up in the nutritional product. This is e.g. very advantageous when producing organic nutritional products, such as e.g. organic infant formulas, because refined organic ingredients, e.g. organic lactose, are difficult to find commercially and/or are very expensive. If an organic milk feed is employed, the milk serum protein and milk saccharide of the organic milk feed is typically sufficient to provide at least 90% (w/w) of the milk serum protein and at least 90% (w/w) of the carbohydrate to some nutritional products, such e.g. infant formulas.

Yet an aspect of the invention pertains to a method of producing a demineralised, milk saccharide-containing milk serum protein product, the method comprising the steps of:
  i) providing a milk feed,
  ii) subjecting the milk feed to microfiltration (MF) or microfiltration/diafiltration, thereby providing an MF retentate and an MF permeate,
  iii) subjecting the MF permeate to nanofiltration or nanofiltration/diafiltration so as obtain an NF retentate and an NF permeate,
  iv) subjecting the NF retentate to electrodialysis, thereby obtaining a demineralized, milk saccharide-containing milk serum protein product,
  v) optionally drying the demineralised, milk saccharide-containing milk saccharide-containing milk serum protein product.

A further aspect of the invention pertains to a method of producing a demineralised, milk saccharide-containing milk serum protein product or whey protein product, the method comprising the steps of:
  1) providing a liquid protein source containing milk serum protein or whey protein,
  2) subjecting the liquid protein source to reduction of inorganic polyvalent ions, which reduction involves adjusting the liquid protein source to a pH of at least 6 and heating it to a temperature of at least 30 degrees C. and separating the resulting precipitate from the liquid protein source, thereby obtaining a demineralised, milk saccharide-containing milk serum protein product or whey protein product,
  3) optionally drying the demineralised, milk saccharide-containing milk serum protein product or whey protein product.

Another aspect of the invention pertains to a nutritional product, e.g. obtainable by the process described herein, comprising protein, milk saccharide and fat and minerals, and comprising:
  a total amount of carbohydrate in the range of 40-55% (w/w total solids)
  a total amount of protein in the range of 9-14% % (w/w total solids)
  a total amount of milk saccharide in the range of 40-55% % (w/w total solids)
  a weight ratio between milk serum protein and casein in the range of 50:50-70:30, preferably in the range of 55:45-65:45, and even more preferably about 60:40,
  a total amount of calcium of at most 0.7% (w/w total solids),
  a total amount of magnesium of at most 0.1% (w/w total solids),
  a total amount phosphorus of at most 0.5% (w/w total solids),
  a total amount of sodium of at most 0.3% (w/w total solids),
  a total amount of potassium of at most 0.8% (w/w total solids), and
  a total amount chlorine of at most 0.8% (w/w total solids)

In the context of the present invention the term "chlorine" relates to elemental chlorine and the total amount of chlorine and pertains to the total amount of elemental chlorine in any form.

Yet another aspect of the invention pertains to a demineralized, milk saccharide-containing milk serum protein product, e.g. obtainable by the method described herein, comprising:
  a total amount of lactose in the range of 65-85% (w/w total solids)
  a total amount of milk serum and whey protein in the range of 10-25% (w/w total solids)
  a weight ratio between milk serum protein and micellar casein is at least 95:5,
  a total amount of calcium of at most 1.0% (w/w total solids)
  a total amount of magnesium of at most 0.1% (w/w total solids)
  a total amount phosphorus of at most 0.8% (w/w total solids)
  a total amount of sodium of at most 0.4% (w/w total solids)
  a total amount of potassium of at most 1.3% (w/w total solids) and
  a total amount chlorine of at most 0.8% (w/w total solids).

DETAILED DESCRIPTION OF THE INVENTION

Figure 1:
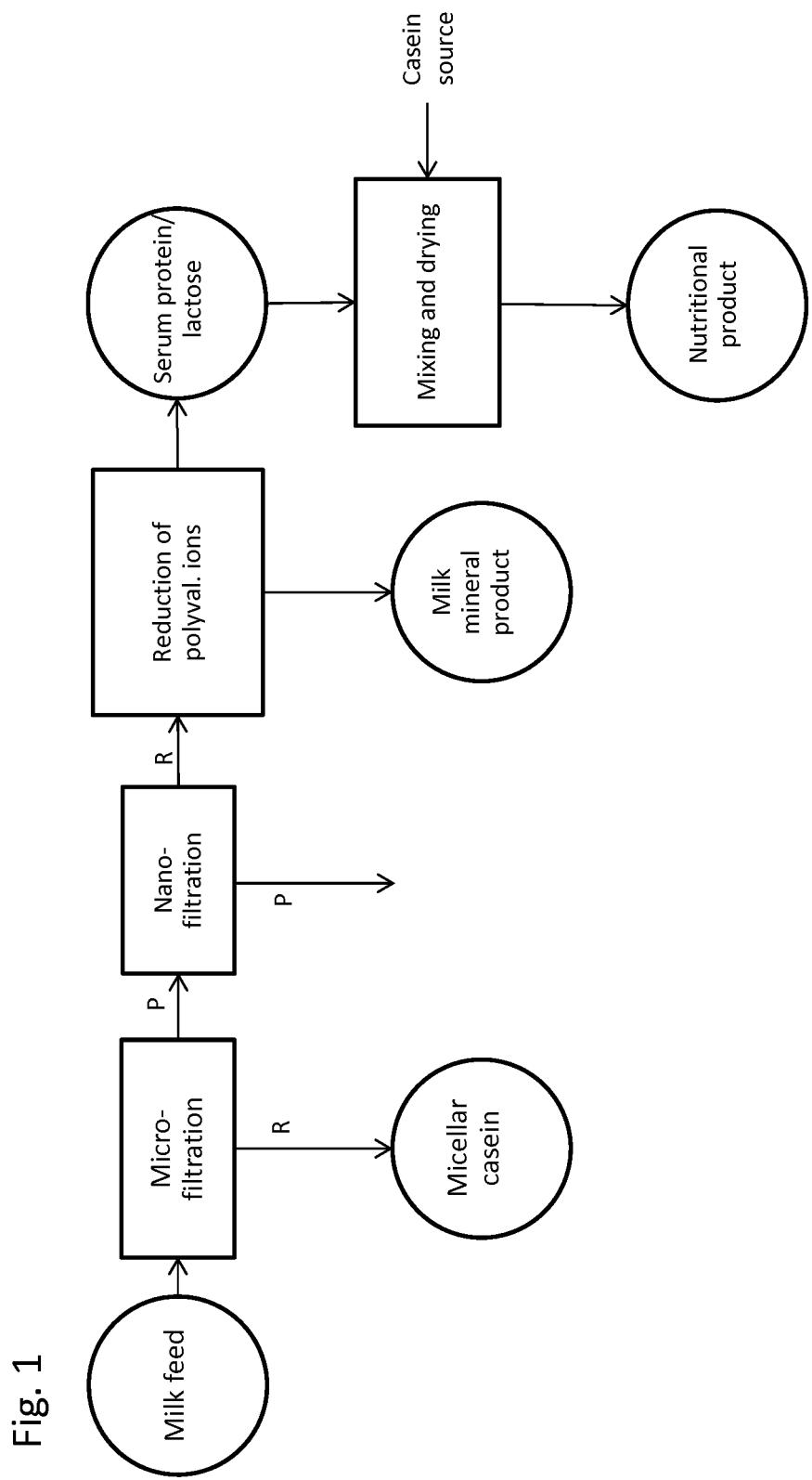
FIG. 1 describes a process variant of the invention for the production of a casein-containing nutritional product, such as e.g. an infant formula.

Thus, a broad aspect of the invention pertains to a method of producing a nutritional product, the method comprising the steps of:
  a) providing a milk feed,
  b) subjecting the milk feed to microfiltration (MF) or microfiltration/diafiltration, thereby providing an MF retentate enriched with respect to micellar casein and an MF permeate enriched with respect to milk serum protein,
  c) subjecting the MF permeate to nanofiltration or nanofiltration/diafiltration using a membrane that allows for the passage of monovalent ions but retains milk saccharide and milk serum protein so as to obtain a nanofiltration (NF) retentate and an NF permeate, d) subjecting the NF retentate to reduction of inorganic polyvalent ions, so as to obtain a demineralised, milk saccharide-containing milk serum protein product which has a reduced level of calcium, magnesium and phosphorus, e) adding a casein source, and optionally one or more additional ingredients, to the demineralised, milk saccharide-containing milk serum protein product to obtain the nutritional product, and f) optionally converting the nutritional product to a powder.

The present inventors have discovered that prior art processes for the preparation of mineral-reduced, milk protein-containing nutritional products, such as e.g. infant formulas, based on fractionated milk proteins can be significantly improved by the present process wherein milk serum protein is not separated from the milk saccharides after the protein fractionation step—contrary to e.g. WO 2013/068653 and WO 2013/137714 which separate milk serum protein from milk saccharides after the MF step just to recombine them at a later stage.

It is particularly preferred that step d) comprises or even consists of an electrodialysis step.

Thus, a preferred aspect of the invention pertains to a method of producing a nutritional product, the method comprising the steps of:

a) providing a milk feed, b) subjecting the milk feed to microfiltration (MF) or microfiltration/diafiltration, thereby providing an MF retentate enriched with respect to micellar casein and an MF permeate enriched with respect to serum protein, c) subjecting the MF permeate to nanofiltration (NF) or nanofiltration/diafiltration using a membrane that allows for the passage of monovalent ions but retains milk saccharide so as to obtain an NF retentate and an NF permeate, d) subjecting the NF retentate to electrodialysis so as to obtain a demineralised, milk saccharide-containing milk serum protein product which has a reduced level of calcium, magnesium and phosphorus, e) adding a casein source, and optionally one or more additional ingredients, to the demineralised, milk saccharide-containing milk serum protein product to obtain the nutritional product, and f) optionally converting the nutritional product to a powder.

In the context of the present invention, the term "nutritional product" pertains to an edible product which contains at least protein and carbohydrate, and optionally also lipids. The nutritional product may e.g. be a paediatric nutritional product, such as e.g. an infant formula, a follow-on formula or a growing up-formula. The nutritional product may be nutritionally complete for the intended consumer, e.g. an infant between 0-6 months or an infant between 6-12 moths, or it may be a nutritional supplement.

The nutritional product may be in the form of a liquid product, a concentrated liquid product, a paste or a powder.

Another advantage of the present invention is that it reduces the energy consumption required per kg processed milk feed or per kg milk saccharide-containing milk serum protein composition.

The present invention furthermore provides a lower milk feed consumption per kg nutritional product or per kg demineralized, milk saccharide-containing milk serum protein product than the prior art, particularly if the prior art employs lactose crystallization to purify lactose derived from an MF or UF permeate.

In some preferred embodiments of the invention, the nutritional product is a liquid. A liquid nutritional product is often perceived as more convenient in use than powdered nutritional products and is ready for ingestion.

In the case of a liquid nutritional product, the nutritional product comprises water in an amount of at least 75% (w/w) relative to the weight of the nutritional product, and the solids content of the nutritional product is at most 25% (w/w) relative to the weight of the nutritional product. For example, the liquid nutritional product may comprise water in an amount of at least 85% (w/w) relative to the weight of the nutritional product, and the solids content of the nutritional product may be at most 15% (w/w) relative to the weight of the nutritional product.

In yet preferred embodiments of the invention, the nutritional product is a concentrated nutritional product.

In the case of a concentrated nutritional product, the nutritional product comprises water in an amount in the range of 30-74% (w/w) relative to the weight of the nutritional product, and the solids content of the nutritional product is typically in the range of 26-70% (w/w) relative to the weight of the nutritional product. For example, the concentrated nutritional product may comprise water in an amount in the range of 40-60% (w/w) relative to the weight of the nutritional product, and the solids content of the nutritional product may be in the range of 40-60% (w/w) relative to the weight of the nutritional product.

The contents of water and total solids in the nutritional product are determined according to NMKL 110 $2^{nd}$ Edition, 2005 (Total solids (Water)—Gravimetric determination in milk and milk products). NMKL is an abbreviation for "Nordisk Metodikkomité for Næringsmidler".

In yet preferred embodiments of the invention, the nutritional product is a paste-like nutritional product.

In the case of a paste-like nutritional product, the nutritional product comprises water in an amount in the range of 7-29% (w/w) relative to the weight of the nutritional product, and the solids content of the nutritional product is typically in the range of 71-93% (w/w) relative to the weight of the nutritional product. For example, the paste-like nutritional product may comprise water in an amount in the range of 15-25% (w/w) relative to the weight of the nutritional product, and the solids content of the nutritional product may be in the range of 75-85% (w/w) relative to the weight of the nutritional product.

In further preferred embodiments of the invention, the nutritional product is a powdered nutritional product.

In the case of a powdered nutritional product, the nutritional product comprises water in an amount in the range of 1-6% (w/w) relative to the weight of the nutritional product, and the solids content of the nutritional product is typically in the range of 94-99% (w/w) relative to the weight of the nutritional product. For example, the powdered nutritional product may comprise water in an amount in the range of 2-4% (w/w) relative to the weight of the nutritional product, and the solids content of the nutritional product may be in the range of 96-98% (w/w) relative to the weight of the nutritional product.

The method is preferably performed in the sequence a), b), c), d) and e) or, if the nutritional product is converted to a powder, in the sequence a), b), c), d), e) and f).

A schematic example of the method steps a)-f) are illustrated in FIG. 1. Here, a milk feed is subjected to microfiltration, resulting in a permeate (P) containing primarily milk serum protein, milk saccharide, water and mineral and a retentate (R) containing primarily casein micelles, water and additionally small amounts of milk serum protein, milk saccharide and mineral. The permeate is subjected to nanofiltration providing an NF permeate (P) containing monovalent ions and water, and an NF retentate (R) containing milk serum protein, milk saccharide, water and the remaining mineral. The NF retentate is subjected to reduction of the amount of polyvalent inorganic ions, e.g. by mineral precipitation or electrodialysis, and provides a mineral-containing precipitate and mineral-reduced, milk saccharide-containing milk serum protein. In this example, the milk saccharide primarily contains lactose. The mineral-reduced, milk saccharide-containing milk serum protein is then mixed with a casein source, such as e.g. skimmed milk, and the mixture is converted to a powdered nutritional product by spray-drying.

In some preferred embodiments of the invention, the nutritional product comprises at least 60% of the milk saccharide present in the milk feed. Preferably, the nutritional product comprises at least 70% of the milk saccharide present in the milk feed. Even more preferably, the nutritional product comprises at least 80% of the milk saccharide present in the milk feed.

In other preferred embodiments of the invention, the nutritional product comprises at least 80% of the milk saccharide present in the milk feed. Preferably, the nutritional product comprises at least 90% of the milk saccharide present in the milk feed. Even more preferably, the nutritional product comprises at least 95% of the milk saccharide present in the milk feed.

It is particularly preferred that the nutritional product comprises at least 97% of the milk saccharide present in the milk feed.

In the context of the present invention, the term "milk saccharide" pertains to a) lactose, also sometimes referred to as milk sugar, b) glucose and galactose, which are the monosaccharide reaction products obtained from lactose hydrolysis, and c) galacto-oligosaccharides (GOS), which may e.g. be obtained during hydrolysis of lactose by some beta-galactosidase enzymes.

The milk feed and the streams containing milk saccharide also typically contain milk-oligosaccharides in addition to the milk saccharide, and an advantage of the present method is that less milk-oligosaccharides are lost during processing than prior art processes which employ lactose crystallisation for lactose purification.

The GOS may be present in milk feed from the beginning or may be produced during the processing of the milk feed and/or subsequent product streams. GOS is the result of trans-galactosylation of lactose, glucose and galactose and typically primarily contains disaccharides, trisaccharides and tetra-saccharides.

The total amount of milk saccharide therefore refers to the total amount of galactose, glucose, lactose and GOS (up to and including GOS tetra-saccharides). The total amount of milk saccharide is measured according to Example 1.

The milk feed that is provided in step a) is the liquid feed that is subjected to the microfiltration step in which casein micelle and milk serum protein are separated.

The content of milk saccharides may vary over a broad range depending e.g. on seasonal variation in the milk source and the pre-treatment to which the milk source has been subjected during the preparation of the milk feed.

In some preferred embodiments of the invention, the milk feed comprises a total amount of milk saccharide in range of 0.5-10% (w/w). Preferably, the milk feed comprises a total amount of milk saccharide in the range of 2-7% (w/w). Even more preferred, the milk feed comprises a total amount of milk saccharide in the range of 2-6%.

In other preferred embodiments of the invention, the milk feed comprises a total amount of milk saccharide in the range of 0.5-7% (w/w). Preferably, the milk feed comprises a total amount of milk saccharide in the range of 1.0-5% (w/w). For example, the milk feed comprises a total amount of milk saccharide in the range of 1.0-3%.

In further preferred embodiments of the invention, the milk feed comprises a total amount of milk saccharide in range of 4-10% (w/w). Preferably, the milk feed comprises a total amount of milk saccharide in the range of 5-9% (w/w). For example, the milk feed comprises a total amount of milk saccharide in the range of 6-8%.

In a number of preferred embodiments of the invention, the milk feed comprises a total amount of lactose in range of 0.5-10% (w/w). Preferably, the milk feed comprises a total amount of lactose in the range of 2-7% (w/w). Even more preferred, the milk feed comprises a total amount of lactose in the range of 2-6%.

In other preferred embodiments of the invention, the milk feed comprises a total amount of lactose in range of 0.5-7% (w/w). Preferably, the milk feed comprises a total amount of lactose in the range of 1.0-5% (w/w). For example, the milk feed comprises a total amount of lactose in the range of 1.0-3%.

In further preferred embodiments of the invention, the milk feed comprises a total amount of lactose in the range of 4-10% (w/w). Preferably, the milk feed comprises a total amount of lactose in the range of 5-9% (w/w). For example, the milk feed comprises a total amount of lactose in the range of 6-8%.

While other carbohydrates may be added to the milk feed, it is preferred that the carbohydrate of the milk feed comprises at least 95% milk saccharide, and even more preferred essentially consists of milk saccharide.

The milk feed comprises, in addition to milk saccharide, milk protein including both casein and milk serum protein.

The casein of the milk feed is primarily present in the form of casein micelles, similar or even identical to the casein micelles found in e.g. skimmed milk.

The term "milk serum" pertains to the liquid phase of milk in which casein micelles and milk fat globules are dispersed.

In the context of the present invention, the terms "milk serum protein" or "serum protein" pertain to the proteins found in the milk serum. The milk serum proteins typically include beta-lactoglobulin, alpha-lactalbumin, bovine serum albumin, immunoglobulin and osteopontin as well as lactoferrin and lactoperoxidase. The milk serum protein may furthermore contain a significant amount of beta-casein when the milk feed has been stored at low temperature without subsequent heat-treatment prior to the protein-fractionating microfiltration step.

The term "protein" pertains to polypeptides containing at least 10 amino acids and encompasses both single polypeptides as well as aggregates of polypeptides.

In some preferred embodiments of the invention the milk serum protein of the milk feed is present in undenatured, native form, i.e. the same form as in raw milk, which has not been subjected to denaturing heat treatment. It is therefore also preferred that the milk feed and the product stream from which the milk feed has been derived has not been subjected to conditions that have resulted in significant protein denaturation, such as e.g. high temperature for prolonged durations. In the context of the present invention, the term "significant protein denaturation" means that the degree of denaturation of beta-lactoglobulin is at least 10% (w/w). The degree of denaturation of beta-lactoglobulin is measured according to the method described in WO 2012/010699.

The term "non-protein nitrogen" (NPN) pertains to nitrogen found in molecules that are not protein. In milk, a significant portion of the NPN contains urea, ammonium salts and small peptides containing less than 10 amino acids.

The term "whey" pertains to the liquid which is left in the liquid phase when casein is precipitated in milk by means of e.g. acidification and/or protein degradation (e.g. using rennet enzyme during production of cheese). The whey obtained from rennet-based precipitation of casein is typically referred to as sweet whey and the whey obtained from acid precipitation of casein is typically referred to as acid whey, sour whey or casein whey.

The term "whey protein" pertains to the proteins found in whey. The whey proteins typically include beta-lactoglobulin, alpha-lactalbumin, bovine serum albumin and immunoglobulin, lactoferrin, lactoperoxidase and milk fat globular membrane protein. Additionally, whey protein found in sweet whey typically also comprises caseinomacropeptide. The term whey protein includes of course also milk serum protein.

In some embodiments of the invention, the milk feed comprises a total amount of protein in the range of 1-12% (w/w). Preferably, the milk feed comprises a total amount of protein in the range of 2-10% (w/w). Even more preferred, the milk feed comprises a total amount of protein in the range of 3-8%.

The milk feed preferably has a weight ratio between casein and milk serum protein in the range of 70:30-90:10, such as e.g. in the range of 75:25-85:15, and typically in the range of 77:23-83:17.

While the fat content of the milk may vary, it is often preferred that it is lower than about 6%. In some embodiments of the invention, the milk feed comprises a total amount of fat in the range of 0.01-5% (w/w). Preferably, the milk feed comprises a total amount of fat in the range of 0.01-2% (w/w). Even more preferred, the milk feed comprises a total amount of fat in the range of 0.01-0.5% (w/w).

The solids content of the milk feed may vary depending on the used feed but is typically in the range of 1-30% (w/w). Preferably, the solids content of the milk feed is in the range of 4-25% (w/w). Even more preferably, the solids content of the milk feed is in the range of 5-15% (w/w).

A number of different feed types may be used in the present invention. For example, the milk feed may e.g. comprise, or even consist of, whole milk, skim milk, fat-free milk, low fat milk, full fat milk and concentrated milk.

The term "concentrated milk" pertains to milk that has been concentrated by evaporation or by ultrafiltration, nanofiltration and/or reverse osmosis. It is particularly preferred that the concentrated milk is a concentrated, non-evaporated milk, i.e. a milk that has been concentrated by filtration.

The pH of the milk feed is preferably at least 5.0, and typically the pH of the milk feed is similar to that of skimmed milk, i.e. in the range of 6.1-6.8 when measured at 25 degrees C.

The milk feed is normally derived from ruminant milk, such as e.g. from cow, sheep, goat, buffalo, camel, reindeer and/or llama. The milk feed derived from cows is presently preferred.

The milk feed typically contains at least some citrate. The milk feed may e.g. contain an amount of citrate in the range of 0.01-1.0% (w/w) relative to the weight of the milk feed, preferably in the range of 0.05-0.5%, and even more preferably in the range of 0.1-0.4% (w/w) relative to the weight of the milk feed.

The present invention is particularly useful for the processing of organic milk into organic nutritional products. In some preferred embodiments of the invention, the milk feed is therefore an organic milk feed derived from an organic milk source. In some particularly preferred embodiments of the invention, the milk feed is an organic skimmed milk or an organic, concentrated skimmed milk.

In the context of the present invention, the term "organic milk" pertains to milk produced by cattle raised according to the following: The cattle must have free access to certified organic pasture for the entire grazing season. This period is specific to the farm's geographic climate, but must be at least 120 days per year and preferably at least 150 days. Due to weather, season, or climate, the grazing season may or may not be continuous. Organic cattle diets must contain at least 30 percent dry matter (on average) from certified organic pasture. Dry matter intake (DMI) is the amount of feed an animal consumes per day on a moisture-free basis. The rest of its diet must also be certified organic, including hay, grain, and other agricultural products. The livestock should be managed without antibiotics, added growth hormones, mammalian or avian byproducts, or other prohibited feed ingredients (e.g. urea or arsenic compounds).

In some preferred embodiments of the invention, the provision of the milk feed in step a) involves a step of ultrafiltration (UF) and optionally UF/diafiltration of a milk source thereby providing:
 a UF milk retentate, and
 a UF milk permeate, and
at least a portion of the UF milk retentate is used as the milk feed.

In some embodiments of the invention, a portion of the UF milk retentate is used as the milk feed and at least a portion of the remaining UF milk retentate is used as casein source in step e). For example, a portion of the UF milk retentate may be used as the milk feed and all the remaining UF milk retentate may be used as casein source in step e).

The UF milk retentate may be used as milk feed as such or it may be diluted with water, NF permeate and/or RO permeate before it is used as milk feed.

The volume concentration factor is preferably kept fairly low and typically at 3 at the most, preferably at 2.5 at the most, and even more preferably at 2.0 at the most. In some preferred embodiments of the invention, the UF treatment of the milk source does not involve diafiltration.

Useful UF membranes allow for the passage of lactose and small peptides but retain the milk serum protein.

The lactose of the UF milk permeate may for example be purified to a concentration of at least 90% (w/w) lactose relative to dry-matter, preferably at least 95% (w/w) lactose.

Techniques for purification of lactose from protein-free UF-milk/whey permeate streams are well-known in the art and may for example include lactose crystallisation and demineralisation (see e.g. "Membrane filtration and related molecular separation technologies", published by APV Systems, 2000, ISBN 87-88016 757).

In step b) the milk feed is subjected to microfiltration (MF) or microfiltration/diafiltration (MF/DIA) using a membrane type that allows for the passage of serum proteins, milk saccharides and minerals but retains casein micelles. Step b) therefore provides an MF retentate enriched with respect to micellar casein and an MF permeate enriched with respect to milk serum protein, lactose and minerals.

The term "microfiltration/diafiltration" involves diluting the milk feed and/or one or more intermediate retentate streams during the microfiltration process so as to enhance the removal of milk serum protein and milk saccharide from the retentate stream.

Useful, but non-limiting, examples of diluents which can be used for dilution during MF/DIA are tap water, demineralized water, reverse osmosis (RO) permeate, NF permeate from step c). The RO permeate may e.g. be the RO permeate obtained RO treatment of the NF permeate of step c).

As will be clear to the skilled person, the MF or MF/DIA of step b) may be performed using a single MF membrane or by using several MF membranes, e.g. arranged in series. In case of MF/DIA, the same MF membrane may be used several times during step b).

The terms "MF retentate" and "MF permeate" pertain to the final retentate and the combined permeates obtained from MF or MF/DIA.

The MF or MF/DIA of step b) may be operated within a wide range of volume concentration factors (VCF). In some embodiments of the invention, the volume concentration factor (VCF) of the MF or MF/DIA of step b) is in the range of 0.3-5. Preferably, the VCF of the MF or MF/DIA of step b) is in the range of 0.5-4. Even more preferably, the VCF of the MF or MF/DIA of step b) is in the range of 0.5-3.

The VCF is calculated by dividing the feed volume with the retentate volume.

The MF or MF/DIA is preferably operated to obtain a total protein concentration in the MF retentate of at most 15% (w/w) relative to the total weight of the MF retentate, preferably at most 12% (w/w), and even more preferably at most 10% (w/w). The total concentration of protein of the MF retentate is typically in the range 1-15% (w/w) relative to the total weight of the MF retentate, preferably in the range of 3-12% (w/w), and even more preferably in the range of 5-10% (w/w) relative to the total weight of the MF retentate.

In some embodiments of the invention, the temperature of the milk feed during the MF or MF/DIA of step b) is in the range of 1-66 degrees C. Preferably, the temperature of the milk feed during the MF or MF/DIA of step b) is in the range of 45-66 degrees C. Even more preferably, the temperature of the milk feed during the MF or MF/DIA of step b) is in the range of 55-66 degrees C.

In some preferred embodiments of the invention, the temperature of the milk feed during the MF or MF/DIA of step b) is in the range of 45-55 degrees C.

In some preferred embodiments of the invention, the temperature of the milk feed during the MF or MF/DIA of step b) is in the range of 1-20 degrees C., and even more preferably in the range of 4-15 degrees C., such as e.g. 5-10 degrees C. Low temperature MF or MF/DIA is particularly useful when the milk feed is stored at at most 10 degrees C. for at least 0.5 hour immediately before the MF or MF/DIA. Preferably, the milk feed is stored at at most 5 degrees C. for at least 1 hour immediately before the MF or MF/DIA. The cooled milk feed is preferably transferred to the MF or MF/DIA without heating it to a temperature above 30 degrees C., and preferably without heating it to a temperature above 20 degrees C., and even more preferably without heating to a temperature above 15 degrees C.

Beta-casein dissociates from the casein micelles at low temperature and associates to the casein micelles at higher temperature. When the milk feed is stored at low temperature, more beta-casein is therefore released from the casein micelles into the milk serum. When the cooled milk feed is fractionated by MF or MF/DIA at low temperature, the dissociated beta-casein is transferred to the MF permeate. Beta-casein is believed to be an attractive alternative to casein micelles in infant nutrition because human breast milk consists predominantly of beta-casein and milk serum protein. The use of an increasing amount of beta-casein in infant formulas, relative to the total amount of casein, therefore brings the infant formula products closer to human milk.

The trans-membrane pressure (TMP) used for MF or MF/DIA is normally in the range of 0.1-5 bar, preferably 0.2-2 bar and even more preferred in the range of 0.3-1, such as e.g. 0.3-0.8 bar.

As mentioned above, the MF membrane(s) used for MF or MF/DIA should have the ability to retain casein micelles while allowing milk serum protein, lactose and minerals to penetrate.

The pore size of the MF membrane(s) is typically in the range of 0.01-1.0 micron. Preferably, the pore size of the MF membrane(s) is in the range of 0.05-0.8 micron. Even more preferably, the pore size of the MF membrane(s) is in the range of 0.1-0.5 micron.

If the filtration characteristics of the MF membrane(s) are provided in the term of a molecular weight cut-off, the MF membrane(s) typically have a molecular weight cut-off in the range of 200-2000 kDa. Preferably, the MF membrane(s) have a molecular weight cut-off in the range of 300-1500 kDa. Even more preferably, the MF membrane(s) have a molecular weight cut-off in the range of 400-1000 kDa.

The MF membrane(s) may e.g. be polymeric membranes or ceramic membranes.

Non-limiting examples of useful membranes are e.g. ceramic membranes having a pore size of approx. 0.14 micron (Inside Ceram™, Tami Industries, Nyons, France) or polymeric FR membranes having a molecular weight cut-off of approx. 800 kDa (PVDF 800 kDa; from Synder Filtration, USA).

It is particularly preferred that a substantial amount of the milk saccharide of the milk feed is transferred to the MF permeate.

In some preferred embodiments of the invention, the MF or MF/DIA is applied sufficiently to transfer at least 80% (w/w) of the total amount of milk saccharide of the milk feed to the MF permeate. Preferably, the MF or MF/DIA is applied sufficiently to transfer at least 90% (w/w) of the total amount of milk saccharide of the milk feed to the MF permeate. Even more preferably, the MF or MF/DIA is applied sufficiently to transfer at least 95% (w/w) of the total amount of milk saccharide of the milk feed to the MF permeate. Most preferably, the MF or MF/DIA is applied sufficiently to transfer at least 98% (w/w) of the total amount of milk saccharide of the milk feed to the MF permeate, such as approximately 100% (w/w).

In some preferred embodiments of the invention, the MF or MF/DIA is applied sufficiently to transfer at least 80% (w/w) of the total amount of lactose of the milk feed to the MF permeate. Preferably, the MF or MF/DIA is applied sufficiently to transfer at least 90% (w/w) of the total amount of lactose of the milk feed to the MF permeate. Even more preferably, the MF or MF/DIA is applied sufficiently to transfer at least 95% (w/w) of the total amount of lactose of the milk feed to the MF permeate. Most preferably, the MF or MF/DIA is applied sufficiently to transfer at least 98% (w/w) of the total amount of lactose of the milk feed to the MF permeate, such as approximately 100% (w/w).

It is furthermore preferred that a significant amount of the milk serum protein of the milk feed is transferred to MF permeate.

In some preferred embodiments of the invention, the MF or MF/DIA is applied sufficiently to transfer at least 50% (w/w) of the total amount of milk serum protein of the milk feed to the MF permeate. Preferably, the MF or MF/DIA is applied sufficiently to transfer at least 60% (w/w) of the total amount of milk serum protein of the milk feed to the MF permeate. Even more preferably, the MF or MF/DIA is applied sufficiently to transfer at least 70% (w/w) of the total amount of milk serum protein of the milk feed to the MF permeate. For example, the MF or MF/DIA may be applied sufficiently to transfer at least 80% (w/w) of the total amount of milk serum protein of the milk feed to the MF permeate. Alternatively, the MF or MF/DIA may be applied sufficiently to transfer at least 90% (w/w) of the total amount of milk serum protein of the milk feed to the MF permeate. In some preferred embodiments of the invention, the MF or MF/DIA is applied sufficiently to transfer at least 95% (w/w) of the total amount of milk serum protein of the milk feed to the MF permeate.

More details regarding the implementation of MF or MF/DIA can be found in the books "Dairy processing Handbook", 2015, (ISBN 978-9176111321) and "Membrane filtration and related molecular separation technologies", Werner Kofod Nielsen, APV Systems, 2000, ISBN 87-88016757, which are incorporated herein by reference for all purposes.

Step c) involves subjecting the MF permeate to nanofiltration (NF) or nanofiltration/diafiltration (NF/DIA) using a membrane that allows for the passage of monovalent ions but retains at least lactose and milk serum protein so as to obtain a nanofiltration (NF) retentate and an NF permeate. The NF or NF/DIA therefore provides an efficient way of both removing monovalent ions and small NPN molecules, such as e.g. urea, from the MF permeate and optionally also concentrating the MF permeate.

The term "nanofiltration/diafiltration" involves diluting the MF permeate and/or one or more intermediate retentate streams during the nanofiltration process so as to enhance the removal of monovalent ions from the retentate stream.

Useful, but non-limiting, examples of diluents which can be used for dilution during NF/DIA are tap water, demineralized water, reverse osmosis (RO) permeate. The RO permeate may e.g. be the RO permeate obtained RO treatment of the NF permeate of step c).

As will be clear to the skilled person, the NF or NF/DIA of step c) may be performed using a single NF membrane or by using several NF membranes, e.g. arranged in series. In case of NF/DIA, the same NF membrane may be used several times during step c).

The terms "NF retentate" and "NF permeate" pertain to the final retentate and the combined permeates obtained from NF or NF/DIA.

The MF permeate may be subjected directly to NF or NF/DIA or it may be subjected process steps prior to the NF or NF/DIA that do not materially change the composition of the solids of the MF permeate. Such process steps could e.g. be a pasteurisation, an antibacterial microfiltration, a bactofugation, a dilution or a concentration.

Similar to microfiltration, the skilled person may find guidance for the implementation of nanofiltration or nanofiltration/diafiltration in the books "Dairy processing Handbook", 2015, (ISBN 978-9176111321) and "Membrane filtration and related molecular separation technologies", Werner Kofod Nielsen, APV Systems, 2000, ISBN 87-88016757, which are incorporated herein by reference for all purposes.

The VCF of the NF or NF/DIA depends on the actual implementation of the method. The VCF of the NF or NF/DIA is often, but not necessarily always, in the range of 0.1-30, such as e.g. in the range of 0.5-20 or in the range of 1-15.

The temperature of the milk feed during the NF/DIA is typically in the range of 1-20 degrees C., preferably in the range of 2-18 degrees C., and even more preferably in the range of 5-15 degrees C.

The transmembrane pressure used for NF or NF/DIA depends on the actual implementation of the method and the used membrane(s). The transmembrane pressure is often in the range of 5-35 bar, and preferably in the range of 15-22 bar.

The NF membrane used for NF or NF/DIA could be any NF membrane type which is useful for separating lactose, and optionally also glucose and galactose, from monovalent salts. Useful examples of such membranes are a NF245 membrane (DOW Filmtec, USA) or a DL membrane (GE Water, USA).

The used NF membrane(s) typically have a retention of lactose of at least 80% and preferably at least 90%, and a retention of Na, K and Cl of at most approx. 50%. Useful NF membranes often have a molecular weight cut-off in the range of 150-500 Dalton, and preferably in the range of 150-300 Dalton.

In some embodiments of the invention, at least some of the NF permeate is used as diafiltration diluent during the MF/DIA of step b).

In some preferred embodiments of the invention, the NF or NF/DIA is applied sufficiently to remove at least at 50% (mol/mol) of each of sodium, potassium and chlorine of the MF permeate. Preferably, the NF or NF/DIA is applied sufficiently to remove at least 60% (mol/mol) of each of sodium, potassium and chlorine from the MF permeate. Even more preferably, the NF or NF/DIA is applied sufficiently to remove at least 70% (mol/mol) of each of sodium, potassium, and chlorine from the MF permeate.

For example, the NF or NF/DIA may be applied sufficiently to remove at least at 80% (mol/mol) of each of sodium, potassium and chlorine from the MF permeate. The NF or NF/DIA may e.g. applied sufficiently to remove at least at 85% (mol/mol) of each of sodium, potassium and chlorine from the MF permeate. Alternatively, the NF or NF/DIA may be applied sufficiently to remove at least 90% (mol/mol) of each of sodium, potassium, and chlorine from the MF permeate.

The concentrations of Na, K, Ca, Mg, Cl, and P are measured by Induced Coupled PlasmaAtomic Emission Spectroscopy (ICP-AES).

In some preferred embodiments of the invention, the NF retentate contains:
  a total amount of sodium of at most 0.4% (w/w total solids),
  a total amount of potassium of at most 1.3% (w/w total solids), and
  a total amount chlorine of at most 0.8% (w/w total solids).
Preferably, the the NF retentate contains:
  a total amount of sodium of at most 0.4% (w/w total solids),
  a total amount of potassium of at most 1.1% (w/w total solids), and
  a total amount chlorine of at most 0.7% (w/w total solids).

For example, the NF retentate may contain:
a total amount of sodium of at most 0.2% (w/w total solids),
a total amount of potassium of at most 0.5% (w/w total solids), and
a total amount chlorine of at most 0.4% (w/w total solids).

In some preferred embodiments of the invention, the NF retentate contains:
a total amount of sodium in the range of 0.01-0.4% (w/w total solids),
a total amount of potassium in the range of 0.01-1.3% (w/w total solids), and
a total amount chlorine in the range of 0.01-0.8% (w/w total solids).

Preferably, the NF retentate contains:
a total amount of sodium in the range of 0.05-0.4% (w/w total solids),
a total amount of potassium in the range of 0.0.5-1.1% (w/w total solids), and
a total amount chlorine in the range of 0.02-0.7% (w/w total solids).

For example, the NF retentate contains:
a total amount of sodium in the range of 0.05-0.2% (w/w total solids),
a total amount of potassium in the range of 0.1-0.5% (w/w total solids), and
a total amount chlorine in the range of 0.02-0.4% (w/w total solids).

In step d), the NF retentate is subjected to reduction of inorganic polyvalent ions, so as to obtain a demineralised, milk saccharide-containing milk serum protein product which has a reduced level of calcium, magnesium and phosphorus relative to the NF retentate, In the context of the present invention, the term "reduction of polyvalent inorganic ions" pertains to the reduction of the divalent cations $Ca^{2+}$, $Mg^{2+}$, and of inorganic molecules containing phosphorus.

The NF retentate may be subjected directly to the reduction of polyvalent, inorganic ions or it may be subjected to process steps prior to the reduction that do not materially change the composition of the solids of the NF retentate. Such process steps could e.g. be a pasteurisation, an antibacterial microfiltration, a bactofugation, a dilution and/or a concentration.

In some preferred embodiments of the invention, the milk serum protein-containing streams following step b) are not subjected to ultrafiltration. It is particularly preferred that the milk serum protein-containing streams following step b) are not subjected to ultrafiltration that separates milk serum protein from milk saccharide.

The present inventors have found this to be advantageous as one avoids separate handling of milk saccharide streams and milk serum protein streams.

The reduction of polyvalent inorganic ions preferably does not remove significant amounts of milk saccharide or milk serum protein from the NF retentate.

For example, the reduction of polyvalent inorganic ions of step d) may involve electrodialysis, mineral precipitation, and/or ion exchange.

In some embodiments of the invention, the reduction of polyvalent inorganic ions of step d) involves, or even consists of, electrodialysis (ED). Electrodialysis is well-known to the person skilled in the art and is e.g. described in "Membrane filtration and related molecular separation technologies", published by APV Systems, 2000, ISBN 87-88016 757 and in "Ion exchange membranes Fundamentals and Applications", Yoshinobu Tanaka, $2^{nd}$ edition, Elsevier, 2015, ISBN: 978-0-444-63319-4, and "Ion Exchange Membranes Preparation, characterisation, modification and application", Toshikatsu Sata, The Royal Society of Chemistry, 2004, ISBN 0-85404-590-2 which are incorporated herein for all purposes.

Electrodialysis can be implemented in a number of different configurations and for the present invention, it is important that the ED is configured to remove not only small monovalent metal cation and anions but also polyvalent ions, such as e.g. $Ca^{2+}$, $Mg^{2+}$, and phosphates. As described herein, it is furthermore preferred that the ED is configured to remove citrate.

Briefly described, ED typically employs transport of ions from a feed solution through ionexchange membranes into one or more neighbouring solutions under the influence of an applied electric DC field. This is done in a configuration called an electrodialysis cell. The cell typically comprises of a feed compartment (often referred to as the dilute compartment) defined by an anion exchange membrane and a cation exchange membrane and is sandwiched between two concentrate compartments (often referred to as brine compartments). The electric DC field attracts cations of the feed to the negative electrode and anions to the positive electrode and at least the smaller cations and anions are capable of permeating through the cation exchange membrane and the anion exchange membrane, respectively. In this way, charged molecular species are removed from the feed.

In almost all practical electrodialysis processes, multiple electrodialysis cells are arranged into a configuration called an electrodialysis stack, with alternating anion and cation exchange membranes forming the multiple electrodialysis cells.

In some preferred embodiments of the invention the electrodialysis equipment contains at least a feed compartment and optionally also a concentration compartment, which comprises particulate ion exchange materials such as e.g. ion exchange resin. The particulate ion exchange material act to retain the ions, allowing these to be transported across the ion exchange membranes and particularly useful in low conductivity liquids. This variant of electrodialysis is sometimes referred to as electrodeionization.

The inventors have found that it is particularly preferred to use anion exchange membranes that allow the transport of citrate.

In some preferred embodiments of the invention, the anion exchange membrane has a perm-selectivity coefficient of citrate of at least 0.01, preferably at least 0.05, more preferably at least 0.1, and even more preferably at least 0.2. For example, the anion exchange membrane have a perm-selectivity coefficient of citrate of at least 0.3, preferably at least 0.4, more preferably at least 0.5, and even more preferably at least 0.6.

The "perm-selectivity coefficient of citrate" of an anion exchange membrane is measured according to Example 1.2. The determination of the perm-selectivity coefficient of citrate of the membrane uses the anion chloride as reference anion and the term "perm-selectivity coefficient of citrate" may therefore also be referred to as the "perm-selectivity coefficient of citrate relative to chloride".

The ion exchange membranes may also be characterised with respect to their perm-selectivity, i.e. their selectivity towards permeation of counter-ions (e.g. permeation of anions through an anion exchange membrane) relative to their permeation of co-ions (e.g. permeation of cation through an anion exchange membrane).

In some preferred embodiments of the invention, the anion exchange membrane used for electrodialysis has a perm-selectivity of at least 0.4, preferably at least 0.5, more preferably at least 0.6, and even more preferably at least 0.7. The anion exchange membrane used for electrodialysis preferably has a perm-selectivity of at least 0.8, more preferably at least 0.9, and even more preferably at least 0.95.

It is equally desirable that the cation exchange membrane has a relatively high perm-selectivity. Thus, in some preferred embodiments of the invention, the cation exchange membrane used for electrodialysis has a perm-selectivity of at least 0.4, preferably at least 0.5, more preferably at least 0.6, and even more preferably at least 0.7. The cation exchange membrane used for electrodialysis preferably has a perm-selectivity of at least 0.8, more preferably at least 0.9, and even more preferably at least 0.95.

Non-limiting examples of useful membranes are e.g. Ralex CM(H)-PES cation membranes and Ralex AM(H)-PES anion membranes from MEGA (Czech Republic). Other examples of membranes can be found Tanaka 2015.

The pH of the NF permeate, when initially subjected to electrodialysis, is typically at least 5.5, and preferably at least 6.0. In some embodiments of the invention, the pH of the NF permeate when initially subjected to electrodialysis used for precipitation is in the range of 5.5-7.0, in the range of 5.7-6.8, and more preferably in the range of 6.0-6.5.

In some preferred embodiments of the invention, the concentrate stream of the ED has a pH of at most 6.0, preferably at most 5.6, more preferably at most 5.2, and most preferably at most 5.0. The relatively low pH of the concentrate stream counteracts precipitation of calcium phosphate in the concentrate stream.

The temperature of the liquid feed and concentrate during electrodialysis is typically in the range of 0-70 degrees C. Preferably, the temperature of the liquid feed and concentrate during electrodialysis is in the range of 2-40 degrees C. Even more preferred, the temperature of the liquid feed and concentrate during electrodialysis is in the range of 4-15 degrees C., such as e.g. preferably in the range of 5-10 degrees C.

The ED voltage depends on the actual setup of ED system and may e.g. be in the range of 1-500 V, e.g. in the range of 50-400 V, such as e.g. in the range of 100-300 V. In some embodiments of the invention during the ED is kept constant during the ED electrodialysis step.

In some preferred embodiments of the invention the ED of step d) is conducted until the conductivity of the NF retentate is reduced with at least 40%, preferably at least 50%, more preferably at least 60%, even more preferably at least 70%, and most preferably at least 80%.

In some preferred embodiments of the invention the ED of step d) is conducted until the conductivity of the NF retentate is reduced with at least 40%, preferably at least 50%, more preferably at least 60%, even more preferably at least 70%, and most preferably at least 80%.

It is also possible to control the ED process by the level of reduction of citrate. Thus, in some embodiments of the invention the ED of step d) is conducted until the amount of citrate of the initial NF retentate is reduced with at least 30%, preferably at least 50%, more preferably at least 70%, even more preferably at least 80%, and most preferably at least 90%.

In some embodiments of the invention it is furthermore preferred that only a limited amount of the sialyllactose of the NF retentate provided by step c) is removed. This may be accomplished by selecting an anion exchange membrane that is impermeable to sialyllactose and/or by stopping the ED process before sialyllactose is removed. Preferably the ED process of step d) removes at most 50% (w/w) of the sialyllactose of the NF retentate, preferably at most 40% (w/w), more preferably at most 30% (w/w), even more preferably at most 20% (w/w), and most preferably at most 10% (w/w). Preferably the ED process of step d) does not remove any sialyllactose.

In other embodiments of the invention, the reduction of polyvalent inorganic ions of step d) involves, or even consists of, ion exchange. Ion exchange is also a process well-known to the person skilled in the art and is e.g. described in Protein Purification: Principles and Practice; Robert K. Scopes; $3^{rd}$ edition, Springer Verlag New York, Inc., ISBN 0-387-94072-3 or in "Membrane filtration and related molecular separation technologies", published by APV Systems, 2000, ISBN 87-88016 757 which is incorporated herein for all purposes.
which are incorporated herein for all purposes.

However, in some preferred embodiments of the invention, the reduction of polyvalent inorganic ions of step d) does not involve electrodialysis. In some preferred embodiments of the invention, the reduction of polyvalent inorganic ions of step d) does not involve ion exchange.

In some preferred embodiments of the invention, the reduction of polyvalent inorganic ions of step d) neither involves electrodialysis, ion exchange or ultrafiltration that separated milk saccharide from milk serum proteins.

In some preferred embodiments of the invention, the reduction of polyvalent inorganic ions of step d) involves, or even consists of, mineral precipitation which involves forming a mineral-containing precipitate using at least one of the following:

adjusting the pH of the NF retentate to at least 6.0,
heating the NF retentate to a temperature of at least 30 degrees C., and
concentrating the NF retentate,
and separating the mineral precipitate from the NF retentate so as to obtain the demineralised, milk saccharide-containing milk serum protein product and a mineral-containing precipitate.

The pH used for precipitation is at least 6.0, and preferably at least 6.3. In some embodiments of the invention, the pH used for precipitation is at least 6.5. Preferably, the pH used for precipitation is at least 7.0. Even more preferred, the pH used for precipitation is at least 8.0.

pH values which are provided herein are measured at 25 degrees C. unless it is specified otherwise.

In some preferred embodiments of the invention, the pH used for precipitation is the same as the pH which is normally found in milk. This is particularly advantageous as the need for pH adjustment is either reduced or eliminated. The addition of an alkalizing agent, e.g. in the form of NaOH or KOH, also contributes with more mineral cations which may have be removed subsequently.

Thus, in some preferred embodiments of the invention, the pH used for precipitation is in the range of 6.0-7.0. Preferably, the pH used for precipitation is in the range of 6.2-6.9. Even more preferably, the pH used for precipitation is in the range of 6.3-6.8.

In other preferred embodiments of the invention, the pH used for precipitation is higher than the pH normally found in milk.

Thus, in other preferred embodiments of the invention, the pH used for precipitation is in the range of 6.9-9. Preferably, the pH used for precipitation is in the range of 7.2-8.5. Even more preferably, the pH used for precipitation is in the range of 7.5-8.0. An increased pH results in a more efficient precipitation and/or allows for operating the precipitation step at a lower temperature than if a lower pH had been used.

In further preferred embodiments of the invention, the pH used for precipitation is in the range of 6.0-9, preferably 6.2-8.0 and even more preferably in the range of 6.5-7.5.

The temperature used for precipitation is at least 30 degrees C. Preferably, the temperature used for precipitation is at least 40 degrees C. Even more preferred, the temperature used for precipitation is at least 50 degrees C.

In some preferred embodiments of the invention, the temperature used for precipitation is in the range of 30-75 degrees C. Preferably, the temperature used for precipitation is in the range of 45-65 degrees C. Even more preferred, the temperature used for precipitation is in the range of 55-65 degrees C.

In some preferred embodiments of the invention, the pH for the precipitation is in the range of 6.1-6.8, preferably 6.3-6.7, and the temperature is kept in the range of 55-75 degrees C. For example, the pH for the precipitation may be in the range of 6.3-6.7 and the temperature is kept in the range of 60-70 degrees C.

In other preferred embodiments of the invention, the pH for the precipitation is in the range of 6.9-9, preferably 7.0-8.0, and the temperature is kept in the range of 55-75 degrees C. For example, the pH during the precipitation may be in the range of 7.0-8.0 and the temperature is kept in the range of 60-70 degrees C.

The conditions for formation of precipitate should preferably be maintained for a duration sufficient for precipitating a significant amount of the calcium, magnesium and phosphorus. For example the conditions for formation of precipitate are typically maintained for at least 1 minute and preferably even longer, such as e.g. at least 10 minutes or even at least 15 minutes.

In some preferred embodiments of the invention, the conditions for formation of precipitate are maintained for at least 20 minutes. Preferably, the conditions for formation of precipitate are maintained for at least 30 minutes. For example, the conditions for formation of precipitate are maintained for at least 1 hour.

In some embodiments of the invention, the conditions for formation of precipitate are maintained for 1 minute to 48 hours. For example, the conditions for formation of precipitate are maintained for 5 minutes to 5 hours. Alternatively, the conditions for formation of precipitate are maintained for 10 minutes to 2 hours. In some preferred embodiments of the invention, the conditions for formation of precipitate are maintained for 15 minutes to 1 hour.

In some preferred embodiments of the invention, the conditions for formation of precipitate are maintained for a duration sufficient to precipitate at least 30% (w/w) of the calcium of the NF retentate, preferably at least 35% (w/w) and even more preferably at least 40% (w/w).

More calcium may be precipitated and in some preferred embodiments of the invention, the conditions for formation of precipitate are maintained for a duration sufficient to precipitate at least 50% (w/w) of the calcium of the NF retentate, preferably at least 60% (w/w) and even more preferably at least 70% (w/w).

In some preferred embodiments of the invention, the conditions for formation of precipitate are maintained for a duration sufficient to precipitate at least 30% (w/w) of the phosphorus of the NF retentate, preferably at least 35% (w/w) and even more preferably at least 40% (w/w).

More phosphorus may be precipitated and in some preferred embodiments of the invention, the conditions for formation of precipitate are maintained for a duration sufficient to precipitate at least 50% (w/w) of the phosphorus of the NF retentate, preferably at least 60% (w/w) and even more preferably at least 70% (w/w).

The mineral precipitate may be separated from the remaining NF retentate by traditional separation techniques, such as e.g. centrifugation, microfiltration, or decantation.

In the context of the present invention, the terms "demineralised" and "mineral-reduced" are used interchangeably and means that at least some minerals have been removed from a feed to arrive at the composition in question. A "demineralised" and "mineral-reduced" product or composition preferably contains at most 0.6% (w/w TS) calcium, preferably at most 0.4% (w/w) calcium and even more preferred at most 0.2% (w/w) calcium, such at e.g. preferably at most 0.1% (w/w) calcium.

In some preferred embodiments of the invention, the demineralised, milk saccharide-containing milk serum protein product obtained from step d) comprises:
- a total amount of calcium of at most 1.0% (w/w total solids),
- a total amount of magnesium of at most 0.1 (w/w total solids), and
- a total amount phosphorus of at most 0.8% (w/w total solids).

For example, the demineralised, milk saccharide-containing milk serum protein product obtained from step d) may comprise:
- a total amount of calcium of at most 0.6% (w/w total solids),
- a total amount of magnesium of at most 0.1 (w/w total solids), and
- a total amount phosphorus of at most 0.4% (w/w total solids).

The demineralised, milk saccharide-containing milk serum protein product obtained from step d) may e.g. comprise:
- a total amount of calcium in the range of 0.01-1.0% (w/w total solids),
- a total amount of magnesium in the range of 0.001-0.1 (w/w total solids), and
- a total amount phosphorus in the range of 0.01-0.6% (w/w total solids).

In some preferred embodiments of the invention, the demineralised, milk saccharide-containing milk serum protein product obtained from step d) comprises:
- a total amount of calcium in the range of 0.1-0.6% (w/w total solids),
- a total amount of magnesium in the range of 0.01-0.1 (w/w total solids), and
- a total amount phosphorus in the range of 0.05-0.4% (w/w total solids).

In step e), a casein source, and optionally one or more additional ingredients, is (are) added to the demineralised, milk saccharide-containing milk serum protein product to obtain the nutritional product. Step e) may furthermore include processing steps such as mixing, homogenisation, evaporation, and/or heat-treatment.

Various casein sources may be used. In some embodiments of the invention, the casein source comprises one or more of milk, concentrated milk, dry milk, UF retentate of milk, milk protein concentrate, a beta-casein isolate, a micellar casein isolate, caseinate, or a combination thereof. It is preferred that the casein of the casein source is micellar casein as e.g. found in skimmed milk and/or beta-casein.

Skimmed milk in the form of liquid skimmed milk or dry skimmed milk powder is particularly preferred.

Additionally, a UF retentate of skimmed milk is a particularly preferred source of casein.

In some preferred embodiments of the invention, both the casein source of step e) and the milk feed of step a) are UF retentates of milk, and e.g. from the same milk batch or from the same category of milk, such as organic milk.

The one or more additional ingredients which may be included into the nutritional product may advantageously be selected amongst the ingredients that typically are used in pediatric products.

For example, the nutritional product, e.g. in the form of an infant formula, may include at least one of the human milk oligosaccharides (HMOs), such as e.g. 2'-FL and LNnT. Research has shown multiple roles for HMOs in improvement of central nervous system (CNS) function. In addition to including at least one of the 2'-FL and the LNnT described above, in certain aspects, the nutritional product includes additional sialylated or fucosylated human milk oligosaccharides (HMOs).

Any or all of the HMO(s) used in the nutritional product may be isolated or enriched from milk(s) secreted by mammals, including, but not limited to: human, bovine, ovine, porcine or caprine species. The HMOs may also be produced via microbial fermentation, enzymatic processes, chemical synthesis or combinations thereof.

Suitable sialylated HMOs for inclusion in the infant formula may e.g. include at least one sialic acid residue in the oligosaccharide backbone. In certain aspects, the sialylated HMO includes two or more sialic acid residues.

Alternatively or additionally, the nutritional product may also contain other types of oligosaccharides such as e.g. trans-galacto-oligosaccharides (GOS), fructose-oligosaccharides (FOS), and/or polydextrose.

The nutritional product, e.g. in the form of an infant formula, may furthermore include one or more poly unsaturated fatty acids (PUFAs), such as e.g. docosahexaenoic acid (DHA), arachidonic acid (AA), eicosapentaenoic acid (EPA), docosapentaenoic acid (DPA), linoleic acid, linolenic acid (alpha linolenic acid) and gamma-linolenic acid.

Research has shown multiple roles for PUFAs in supporting brain and vision development in infants. It is applicants' belief that inclusion of DHA and AA in the infant formula can improve neurological functions, such as cognition, learning, and memory associated with the CNS.

In certain aspects, the PUFAs are provided as free fatty acids, in triglyceride form, in diglyceride form, in monoglyceride form, in phospholipid form or as a mixture of one or more of the above, preferably in triglyceride form. The PUFAs may be derived from oil sources such as plant oils, marine plankton, fungal oils and fish oils. In certain aspects, the PUFAs are derived from fish oils, such as menhaden, salmon, anchovy, cod, halibut, tuna or herring oil.

The nutritional product, e.g. in the form of an infant formula, may furthermore include one or more nucleotides, including e.g. the nucleotide inosine monophosphate, cytidine 5 '-monophosphate, uridine 5'-monophosphate, adenosine 5'-monophosphate, guanosine 5 '-1 monophosphate, more preferably cytidine 5'-monophosphate, uridine 5'-monophosphate, adenosine 5'-monophosphate and guanosine 5'-monophosphate.

The carbohydrate concentration of the nutritional product, e.g. in the form of an infant formula, may e.g. range from about 5% to about 40% (w/w), including from about 7% to about 30%, including from about 10% to about 25%, by weight of the nutritional product. Where present, fat concentrations most typically range from about 1% to about 30%, including from about 2% to about 15%, and also including from about 3% to about 10%, by weight of the infant formula. Where present, protein concentrations most typically range from about 0.5% to about 30%, including from about 1% to about 15%, and also including from about 2% to about 10%, by weight of the nutritional product.

In some embodiments of the invention, the nutritional product, e.g. in the form of an infant formula, includes a source or sources of fat in addition to the PUFAs, described above. Suitable sources of fat for use herein include any fat or fat source that is suitable for use in an oral infant formula and that is compatible with the essential elements and features of such formula.

Additional non-limiting examples of suitable fats or sources thereof for use in the nutritional product described herein include coconut oil, fractionated coconut oil, soybean oil, corn oil, olive oil, safflower oil, high oleic safflower oil, oleic acids (EMERSOL 6313 OLEIC ACID, Cognis Oleochemicals, Malaysia), MCT oil (medium chain triglycerides), sunflower oil, high oleic sunflower oil, palm and palm kernel oils, palm olein, canola oil, marine oils, fish oils, fungal oils, algae oils, cottonseed oils and combinations thereof.

The nutritional product may, in addition to milk serum protein and casein, also contain other types of protein. Non-limiting examples of suitable proteins or sources thereof for use in the nutritional product, e.g. in the form of an infant formula, include hydrolyzed, partially hydrolyzed or non-hydrolyzed proteins or protein sources, which may be derived from any known or otherwise suitable source such as animal (e.g., meat, fish), cereal (e.g., rice, corn), vegetable (e.g., soy) or combinations thereof. Non-limiting examples of such proteins include extensively hydrolyzed casein, soy protein isolates, and soy protein concentrates.

The nutritional product may for example contain a hydrolyzed protein, i.e., a protein hydrolysate. In this context, the terms "hydrolyzed protein" or "protein hydrolysates" are used interchangeably herein and include extensively hydrolyzed proteins, wherein the degree of hydrolysis is most often at least about 20%, including from about 20% to about 80%, and also including from about 30%) to about 80%), even more preferably from about 40%> to about 60%>. The degree of hydrolysis is the extent to which peptide bonds are broken by a hydrolysis method. The degree of protein hydrolysis for purposes of characterizing the extensively hydrolyzed protein component of these embodiments is easily determined by one of ordinary skill in the formulation arts by quantifying the amino nitrogen to total nitrogen ratio (AN/TN) of the protein component of the selected liquid formulation. The amino nitrogen component is quantified by USP titration methods for determining amino nitrogen content, while the total nitrogen component is determined by the Tecator Kjeldahl method, all of which are well known methods to one of ordinary skill in the analytical chemistry art.

Suitable hydrolyzed proteins include soy protein hydrolysate, casein protein hydrolysate, whey protein hydrolysate, rice protein hydrolysate, potato protein hydrolysate, fish protein hydrolysate, egg albumen hydrolysate, gelatin protein hydrolysate, combinations of animal and vegetable protein hydrolysates, and combinations thereof. Particularly preferred protein hydrolysates include whey protein hydrolysate and hydrolyzed sodium caseinate.

The nutritional product may, in addition to the milk saccharide, contain additional carbohydrate. Non-limiting examples of suitable carbohydrates or sources thereof include maltodextrin, hydrolyzed or modified starch or cornstarch, glucose polymers, corn syrup, corn syrup solids, rice-derived carbohydrates, pea-derived carbohydrates, potato-derived carbohydrates, tapioca, sucrose, fructose, lactose, high fructose corn syrup, honey, sugar alcohols (e.g., maltitol, erythritol, sorbitol), artificial sweeteners (e.g., sucralose, acesulfame potassium, *stevia*) and combinations thereof. A particularly desirable carbohydrate is a low dextrose equivalent (DE) maltodextrin.

The casein source is typically added to the demineralised, milk saccharide-containing milk serum product in an amount sufficient to obtain the desired weight ratio between casein and milk serum protein in the nutritional product. In some preferred embodiments of the invention, the milk saccharide-containing milk serum product and the casein source are mixed so as to obtain a weight ratio between milk serum protein and casein in the range of 1-9, preferably 1-3, and even more preferably 1.2-1.9, such as approx. 1.5.

In the context of the present invention, the weight ratio between two components A and B is determined as the weight of component A divided by the weight of components B. Thus, if a composition contain 9% (w/w) A and 6% (w/w) B, the weight ratio would be 9%/6%=1.5.

In some embodiments of the invention, at least some of the purified milk saccharide (e.g. lactose) from the UF milk permeate, obtained in step a), is added as an ingredient during step e).

In some embodiments of the invention, the milk saccharide (e.g. lactose) of the nutritional product is from the same milk source, i.e. milk batch, as milk feed.

In some embodiments of the invention, the protein of the nutritional product is from the same milk source as milk feed.

In some preferred embodiments of the invention, the protein and milk saccharide of the nutritional product is provided by organic ingredients. Preferably, the nutritional product is an organic product.

If the nutritional product is intended to be sold or used as liquid product, it may be preferred the subject the nutritional product to a heating treatment having an $F_0$ value equivalent to at least 72 degrees C. for 15 seconds, or even better, having a $F_0$ value equivalent to at least 142 degree C. for 4 sec. The heat treatment may e.g. be an UHT treatment that sterilises the liquid nutritional product.

The pH of the nutritionally product is preferably in the range of 6-7 and even more preferably in the range of 6.0-7.0, such as e.g. in the range of 6.2-7.0.

The pH of the nutritional product is measured by standardising the product to a solid content corresponding to approx. 10 g solids in 90 g demineralised water and measuring the pH at 25 degrees C.

In some preferred embodiments of the invention, the method furthermore contains a step f) of converting the nutritional product obtained from step e) from liquid form to powder form. Any useful powder conversion process may be used, e.g. spray-drying or freeze drying. Suitable methods and details on implementation may e.g. be found in Westergaard, Milk Powder Technology—evaporation and spray drying, 5$^{th}$ edition, 2010, Gea Niro, Copenhagen.

It is furthermore preferred that the nutritional product, either in liquid, concentrated, or powder form, is packaged. The packaging may e.g. be performed under aseptic or sterile conditions and may e.g. involve filling and sealing the nutritional product into sterile containers.

The present inventors have also found that it may be advantageous to stop the process using the above steps a)-d) for producing mineral-reduced, milk saccharide-containing milk serum protein product. Such a milk serum protein product is an interesting ingredient for the production of e.g. infant formula products and can be produced efficiently using the present invention.

Thus, yet an aspect of the invention pertains to a method of producing a demineralised, milk saccharide-containing milk serum protein product, the method comprising the steps of:

i) providing a milk feed,
ii) subjecting the milk feed to microfiltration (MF) or microfiltration/diafiltration, thereby providing an MF retentate and an MF permeate,
iii) subjecting the MF permeate to nanofiltration (NF) or nanofiltration/diafiltration (NF/DIA) so as obtain an NF retentate and an NF permeate,
iv) subjecting the NF retentate to reduction of inorganic polyvalent ions, thereby obtaining a demineralised, milk saccharide-containing milk serum protein product, and
v) optionally drying the demineralised, milk saccharide-containing milk serum protein product.

Step i) is identical to step a) and all features mentioned in the context of step a) also apply to step i).

Step ii) is identical to step b) and all features mentioned in the context of step b) also apply to step ii).

Step iii) is identical to step c) and all features mentioned in the context of step c) also apply to step iii).

Step iv) is identical to step d) and all features mentioned in the context of step d) also apply to step iv).

Figure 2:
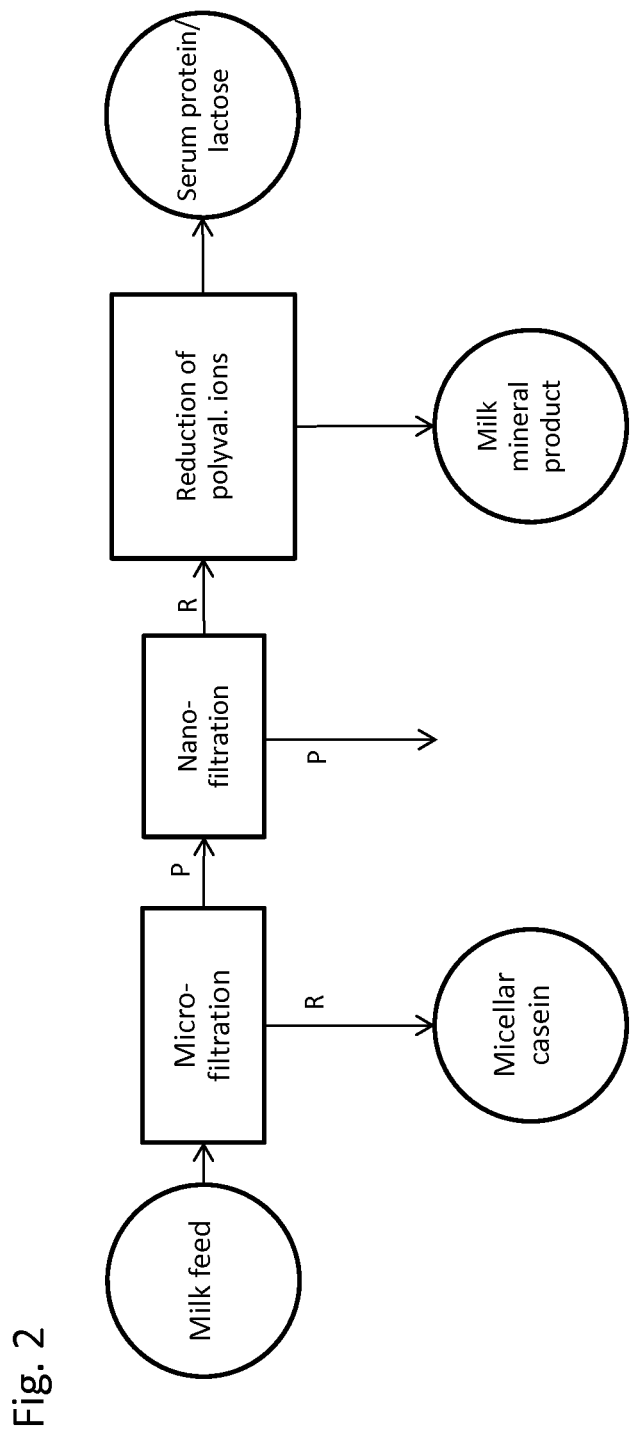
FIG. 2 describes another process variant of the invention for the production of a casein-free milk serum protein ingredient suitable for the production of e.g. an infant formula.

A schematic example of the method steps i)-iv) is illustrated in FIG. 2. Here, a milk feed is subjected to microfiltration, resulting in a permeate (P) containing primarily milk serum protein, milk saccharide, water and mineral and a retentate (R) containing primarily casein micelles, water and additionally small amounts of milk serum protein, milk saccharide and mineral. The permeate is subjected to nanofiltration providing an NF permeate (P) containing monovalent ions and water, and an NF retentate (R) containing milk serum protein, milk saccharide, water and the remaining mineral. The NF retentate is subjected to reduction of the amount of polyvalent inorganic ions, e.g. by mineral precipitation, and provides a mineral-containing precipitate and mineral-reduced, milk saccharide-containing milk serum protein. In this example, the milk saccharide primarily contains lactose. The mineral-reduced, milk saccharide-containing milk serum protein may be used as a liquid ingredient as such or it may be converted to a powder by e.g. spray-drying.

Thus, the method may furthermore contain a step v) of drying the demineralised, milk saccharide-containing milk serum protein product and thereby converting it to a powder. Any useful powder conversion process may be used, e.g. spray-drying or freeze drying. Suitable methods and details on implementation may e.g. be found in Westergaard, Milk Powder Technology—evaporation and spray drying, 5th edition, 2010, Gea Niro, Copenhagen.

It is furthermore preferred that the demineralised, milk saccharide-containing milk serum protein product, typically in powder form, is packaged. The packaging may e.g. be performed under aseptic or sterile conditions and may e.g. involve filling and sealing the nutritional product into sterile containers.

The inventors have found that the mineral precipitation described above also can be used on other types of milk protein solutions than those provided by the above steps a)-c), particularly on other types of milk serum protein solutions or whey protein solutions.

A further aspect of the invention pertains to a method of producing a demineralised, milk serum protein product or whey protein product, the method comprising the steps of:
1) providing a liquid protein source containing milk serum protein or whey protein, and preferably also milk saccharide,
2) subjecting the liquid protein source to reduction of inorganic polyvalent ions, which reduction involves adjusting the liquid protein source to a pH of at least 6 and heating it to a temperature of at least 30 degrees C. and separating the resulting precipitate from the NF retentate, thereby obtaining a milk serum protein product or whey protein product,
3) optionally, drying the milk serum protein product or whey protein product.

Step 2) is identical to step d) and all features mentioned in the context of step d) also apply to step 2), the only difference being that the liquid protein source is subjected to the reduction of inorganic polyvalent ions and not the NF retentate.

In some embodiments of the invention, the liquid protein source comprises a total amount of milk serum protein and whey protein in the range of 1-15% (w/w). Preferably, the liquid protein source comprises a total amount of milk serum protein and whey protein in the range of 2-10% (w/w). Even more preferred, the liquid protein source comprises a total amount of milk serum protein and whey protein in the range of 3-8%.

The liquid protein source preferably contains less than 5% (w/w total protein) casein and is preferably substantially free of casein in which case it contains at most 1% casein (w/w total protein).

An additional aspect of the invention pertains to a nutritional product, e.g. obtainable by the method described herein, comprising
20-90% (w/w TS) carbohydrate,
5-40% (w/w TS) protein,
0-40% (w/w TS) lipid, and
at least 15% (w/w) whey protein relative to total protein, and
at most 1% (w/w TS) citrate.

In some preferred embodiments of the invention, the nutritional product is suitable for paediatric nutrition.

The nutritional product preferably comprises at least one protein ruminant milk protein. Preferably at least the whey protein of the nutritional product is ruminant whey protein and preferably bovine whey protein. In some preferred embodiments of the invention, the protein of the nutritional product is of bovine origin and preferably derived from bovine milk.

In some preferred embodiments of the invention, the nutritional product is a nutritional product, such as e.g. infant formula, a follow-on formula or a growing-up formula.

In some preferred embodiments of the invention, the nutritional product is an infant formula.

Preferably, the nutritional product is an infant formula comprising
35-70% (w/w TS) carbohydrate
5-15% (w/w TS) protein,
20-40% lipid (w/w TS),
30-70% (w/w) whey protein relative to total protein, and
30-70% (w/w) casein relative to total protein.

In the context of the present invention, the term "infant formula" pertains to nutritionally complete food products for infants of 0-6 months which food products comply with the US Code of Federal Regulations, Title 21, CHAPTER I, SUBCHAPTER B, PART 107 (INFANT FORMULA), Subpart D (Nutrient Requirements); Sec. 107.100 Nutrient specifications as in force on 1 Apr. 2015.

In some preferred embodiments of the invention, the nutritional product, e.g. in the form of an infant formula, contains protein, milk saccharide and fat and minerals, and comprises:
a total amount of carbohydrate in the range of 40-55% (w/w total solids)
a total amount of protein in the range of 9-14% % (w/w total solids)
a total amount of milk saccharide in the range of 40-55% % (w/w total solids)
a weight ratio between milk serum protein and casein in the range of 50:50-70:30, preferably in the range of 55:45-65:45, and even more preferably about 60:40,
a total amount of calcium of at most 0.7% (w/w total solids),
a total amount of magnesium of at most 0.1% (w/w total solids),
a total amount phosphorus of at most 0.5% (w/w total solids),
a total amount of sodium of at most 0.3% (w/w total solids),
a total amount of potassium of at most 0.8% (w/w total solids), and
a total amount chlorine of at most 0.8% (w/w total solids).

In other preferred embodiments of the invention, the nutritional product is an infant formula ingredient, also referred to as an infant formula base, which typically lacks some components required to provide a nutritionally complete infant formula.

In some preferred embodiments of the invention, the nutritional product is an infant formula base product comprising:
30-70% (w/w) whey protein relative to total protein, and
30-70% (w/w) casein relative to total protein.
Preferably, the infant formula base comprises
35-70% (w/w TS) milk saccharide
5-15% (w/w TS) protein,
20-40% lipid (w/w TS),
30-70% (w/w) milk serum protein relative to total protein, and
30-70% (w/w) casein relative to total protein.
Even more preferably, the infant formula base comprises
35-70% (w/w TS) milk saccharide
5-15% (w/w TS) protein,
20-40% lipid (w/w TS),
50-70% (w/w) milk serum protein relative to total protein, and
30-50% (w/w) casein relative to total protein.

In the context of the present invention, the term "infant formula base" pertains to an ingredient that contains at least the protein carbohydrate required for an infant formula, and optionally also the lipid, but which is not nutritionally complete, meaning that it lacks at least some of the micro nutrients required according to US Code of Federal Regulations, Title 21, CHAPTER I, SUBCHAPTER B, PART 107 (INFANT FORMULA), Subpart D (Nutrient Requirements); Sec. 107.100 Nutrient specifications as in force on 1 Apr. 2015.

Preferably, the infant formula base only contains milk solids, i.e. only solids derived from milk.

In some embodiments of the invention, the nutritional product is a follow-on formula or a growing up formula.

In some preferred embodiments of the invention, the nutritional product is a demineralised, milk saccharide-containing milk serum protein product comprising
- 20-90% (w/w TS) milk saccharide
- 5-40% (w/w TS) protein,
- 0-10% lipid (w/w TS),
- at least 60% (w/w) whey protein relative to total protein, and
- at most 40% casein, preferably of which at least 50% (w/w) is beta-casein, relative to total protein.

In some preferred embodiments of the invention the demineralised, milk saccharide-containing milk serum protein product comprises:
- 20-90% (w/w TS) milk saccharide
- 5-40% (w/w TS) protein,
- 0-10% lipid (w/w TS),
- at least 70% (w/w) whey protein relative to total protein, and
- at most 30% casein relative to total protein.

Alternatively, but also preferred, the demineralised, milk saccharide-containing milk serum protein product may comprise:
- 20-90% (w/w TS) milk saccharide
- 5-40% (w/w TS) protein,
- 0-10% lipid (w/w TS),
- 60-80% (w/w) whey protein relative to total protein, and
- 20-40% (w/w) casein of which at least 50% (w/w) is beta-casein, relative to total protein.

The demineralised, milk saccharide-containing milk serum protein product may e.g. comprise
- 20-80% (w/w TS) milk saccharide
- 10-30% (w/w TS) protein,
- 0-10% lipid (w/w TS),
- at least 90% (w/w) whey protein relative to total protein, and
- at most 10% casein relative to total protein.

For example, the nutritional product may be a demineralised, milk saccharide-containing milk serum protein product, e.g. obtainable by the method defined herein, comprising:
- a total amount of lactose in the range of 65-85%
- a total amount of milk serum and whey protein in the range of 10-25%
- a weight ratio between milk serum protein and micellar casein is at least 95:5,
- a total amount of calcium of at most 1.0% (w/w total solids)
- a total amount of magnesium of at most 0.1% (w/w total solids)
- a total amount phosphorus of at most 0.8% (w/w total solids)
- a total amount of sodium of at most 0.4% (w/w total solids)
- a total amount of potassium of at most 1.3% (w/w total solids) and
- a total amount chlorine of at most 0.8% (w/w total solids).

In the context of the present invention, percentages of components are weight percentages of the component relative to the total weight of the composition in question unless specified otherwise.

The carbohydrate of the nutritional composition may be selected from any nutritionally useful carbohydrate and may include both mono-saccharides, di-saccharides, oligosaccharides and/or polysaccharides.

In some particularly preferred embodiments of the invention, the carbohydrate of the nutritional composition, and particularly of the infant formula base and/or the demineralised, milk saccharide-containing milk serum protein product, comprises at least 80% (w/w) milk saccharide relative to the total amount of carbohydrate, preferably at least 90% (w/w) milk saccharide relative to the total amount of carbohydrate, and even more preferably at least 95% (w/w) milk saccharide relative to the total amount of carbohydrate.

In some preferred embodiments of the invention, the carbohydrate is composed of milk saccharide and sialyllactose and only contains traces of other bovine milk oligosaccharides.

The milk saccharide typically contains a significant amount of digestible milk saccharide, i.e. the sum of lactose, glucose and galactose. In some particularly preferred embodiments of the invention, the carbohydrate of the nutritional composition, and particularly of the infant formula base and/or the demineralised, milk saccharide-containing milk serum protein product, comprises at least 80% (w/w) digestible milk saccharide relative to the total amount of carbohydrate, preferably at least 90% (w/w) digestible milk saccharide relative to the total amount of carbohydrate, and even more preferably at least 95% (w/w) digestible milk saccharide relative to the total amount of carbohydrate.

Lactose is a particularly preferred type of milk saccharide and in some embodiments of the invention, the carbohydrate of the nutritional composition, and particularly of the infant formula base and/or the demineralised, milk saccharide-containing milk serum protein product, comprises at least 50% (w/w) lactose relative to the total amount of carbohydrate, preferably at least 80% (w/w) lactose relative to the total amount of carbohydrate, and even more preferably at least 95% (w/w) lactose relative to the total amount of carbohydrate.

In some preferred embodiments of the invention, the nutritional composition comprises sialyllactose in an amount of at least 0.01% (w/w) relative to the total amount of carbohydrate. Preferably, the nutritionally product comprises sialyllactose in an amount of at least 0.02% (w/w), more preferably at least 0.03, and even more preferably at least 0.06% (w/w) relative to the total amount of carbohydrate.

The amount of sialyllactose is determined as the sum of 3'-sialyllactose and 6'-sialyllactose and is determined according to Lee at al, J Dairy Sci. 2015 November; 98(11): 7644-7649. If the sample to be tested includes protein and/or fat this may be removed by filtering the sample (or a solution of it) in a centrifugal filter having a nominal molecular weight cut-off of approx. 3 kDa (e.g. Amicon Ultra-0.5 Centrifugal Filter 3K; Merck KGaA) and subjecting the permeate to the analysis.

Higher contents of sialyllactose are even more preferred. In some preferred embodiments of the invention, the nutritional composition comprises sialyllactose in an amount of at least 0.10% (w/w) relative to the total amount of carbohydrate. Preferably, the nutritionally product comprises sialyllactose in an amount of at least 0.15% (w/w), more preferably at least 0.2% (w/w), and even more preferably at least 0.3% (w/w) relative to the total amount of carbohydrate.

In some preferred embodiments of the invention, for example where the nutritional composition has not been supplemented with extra sialyllactose, the nutritional composition comprises sialyllactose in an amount in the range of 0.01-0.5% (w/w) relative to the total amount of carbohydrate. Preferably, the nutritionally product comprises sialyllactose in an amount in the range of 0.02-0.4% (w/w), more preferably in the range of 0.03-0.3% (w/w), and even more preferably in the range of 0.05-0.3% (w/w) relative to the total amount of carbohydrate.

This is particularly advantageous when the nutritional product is an infant formula base or a milk serum protein because utilizing the native content of sialyllactose of bovine milk reduces the amount of additional sialyllactose that needs to be added to infant formulas in order to reach the concentration of sialyllactose of human breast milk.

In some preferred embodiments of the invention, at least 50% (w/w) of the casein of the nutritional product, e.g. the infant formula, the infant formula base or the demineralised, milk saccharide-containing milk serum protein product, is beta-casein, preferably at least 60% (w/w), more preferably at least 70% (w/w), even more preferred at least 80% (w/w), and most preferred at least 90% (w/w) of the casein is beta-casein. This embodiment is particularly preferred as a higher content of beta-casein brings the protein composition of the nutritional product closer to the protein composition of human milk.

In some preferred embodiments of the invention, the nutritional product comprises one or more of the following:
  a total amount of calcium of at most 0.7% (w/w total solids),
  a total amount of magnesium of at most 0.1% (w/w total solids),
  a total amount phosphorus of at most 0.5% (w/w total solids),
  a total amount of sodium of at most 0.3% (w/w total solids),
  a total amount of potassium of at most 0.8% (w/w total solids), and
  a total amount chlorine of at most 0.8% (w/w total solids).
Preferably, the nutritional product comprises:
  a total amount of calcium of at most 0.7% (w/w total solids),
  a total amount of magnesium of at most 0.1% (w/w total solids),
  a total amount phosphorus of at most 0.5% (w/w total solids),
  a total amount of sodium of at most 0.3% (w/w total solids),
  a total amount of potassium of at most 0.8% (w/w total solids), and
  a total amount chlorine of at most 0.8% (w/w total solids).

In some preferred embodiments of the invention, the nutritional product, e.g. the infant formula base or the demineralised, milk saccharide-containing milk serum protein product, comprises an amount of citrate of at most 0.8% (w/w TS), preferably at most 0.6% (w/w TS), and even more preferably at most 0.4% (w/w TS). Even lower contents of citrate may be preferred. Thus, in some preferred embodiments of the invention, the nutritional product comprises an amount of citrate of at most 0.3% (w/w TS), preferably at most 0.2% (w/w TS), and even more preferably at most 0.1% (w/w TS).

The nutritional product may e.g. have a weight ratio between citrate and total protein of at most 0.06, preferably at most 0.04, more preferably at most 0.02, and even more preferably at most 0.01.

The present inventors have seen indications that precipitate formed during the mineral precipitation which may take place during step d) can be used as a milk mineral source, and for example an organic milk mineral source if the milk feed is organic.

Thus, yet an aspect of the invention pertains to the milk mineral product which is obtainable by the method described herein. More particularly the milk mineral product comprises, or even consists of, the dry-matter of the mineral precipitate, and may be present in powder form containing at most 10% (w/w) water or in the form of a wet sludge containing at least 11% (w/w) water.

Yet an aspect pertains to a method of producing a nutritional product, such as e.g. an infant formula, the method comprising
  providing an infant formula base and/or a demineralised, milk saccharide-containing milk serum protein product as defined herein,
  combining the infant formula base and/or the demineralised, milk saccharide-containing milk serum protein product with one or more additional ingredient(s),
  processing the combination of the infant formula base and/or the demineralised, milk saccharide-containing milk serum protein product with one or more additional ingredient(s) to obtain the nutritional product, e.g. the infant formula.

The additional ingredient(s) used for producing a nutritional product, such as e.g. an infant formula, may e.g. one or more of the nutrients mentioned in the US Code of Federal Regulations, Title 21, CHAPTER I, SUBCHAPTER B, PART 107 (INFANT FORMULA), Subpart D (Nutrient Requirements); Sec. 107.100 Nutrient specifications as in force on 1 Apr. 2015. For example, the additional ingredients may be selected from the nutrients mentioned in Table 8 of Example 9.

The step of processing the combination typically comprises one or more of the following steps: mixing, homogenizing, heating, drying, and/or packaging.

Yet an aspect of the invention pertains to the use of electrodialysis for demineralising a milk serum, which milk serum optionally has been concentrated by nanofiltration, and wherein the electrodialysis uses an anion exchange membrane having perm-selectivity coefficient of citrate of at least 0.01.

The present invention has been described above with reference to specific embodiments. However, other embodiments than the above described are equally possible within the scope of the invention. The different features and steps of various embodiments and aspects of the invention may be combined in other ways than those described herein unless it is stated otherwise.

EXAMPLES

Example 1.1: Quantification of Milk Saccharides

The following method is used to quantify milk saccharides in the nutritional product.

A 10 g sample of the nutritional product to be analysed is adjusted to a solids content of approx. 10% (w/w) by addition of demineralised water (or by low pressure evaporation) and a 2 g sub-sample of the adjusted sample is taken.

Carrez reagents 1 & 2 are added to the sub-sample in sufficient amounts to cause coagulation of all the solids. The subsequent biphasic mixture is filtered using standard filter paper and once again using a disposable PTFE syringe micro-filter (0.45 micron pore size). At this point, the clear solution is subjected to heat (90 degrees C. for 10 minutes) to denature any remaining protein and the solution is filtered using a disposable PFVD syringe micro-filter (0.1 micron pore size). The final clear solutions of saccharides are then placed in an HPLC vial and analysed.

The HPLC Method Used is as Follows:
  System: Agilent
  Column Agilent HiPlex Na polymeric ion exchange column
  Eluent: MilliQ water
  Column: Temperature: 85 degrees C.
  Flow rate: 0.2 mL/min
  Pressure: 21 bar (max 25 for this column)
  Detector: RID at 35 degrees C.
  Quantification of glucose, galactose, disaccharide (incl. lactose and DP2 galacto-oligosaccharide), trisaccharide (DP3 galacto-oligosaccharide) and tetrasaccharide (DP4 galacto-oligosaccharide) is based on peak area. Response factors for all saccharides are also calculated. Retention times and corresponding response factors of the above-mentioned saccharides are determined using analytical standards of glucose, galactose, lactose (DP2), GOS tri-saccharide (4-galactosyllactose) and GOS tetrasaccharide (maltotetraose—used as model for DP4 GOS). These standards may e.g. be acquired from Carbosynth (UK) or Dextra Laboratories Ltd (UK).

The amount of lactose is measured according to COULIER et al, J. Agric. Food Chem. 2009, 57, 8488-8495.

The results obtained from the analyses are correlated to the analysed mass of the sample of the nutritional product and the concentration of glucose, galactose, lactose, disaccharides (incl. lactose), tri-saccharide and tetra-saccharide are provided as weight percent of the saccharide type relative to the total weight of the nutritional product.

Example 1.2: Membrane Characteriation: Determination of the Perm-Selectivity Coefficient of Citrate The perm-selectivity coefficient of citrate of an anion exchange membrane is determined according Tanaka 2015 (Ion exchange membranes Fundamentals and Applications; $2^{nd}$ edition, Elsevier, 2015, ISBN: 978-0-444-63319-4, pages 41-43).

The reference anion for the determination is chloride and the electrolyte solution used for testing is an aqueous solution of 0.5 M sodium citrate and 0.5 M sodium chloride prepared by dissolving the salts in demineralised water.

The temperature of the liquids during the process is set to 25 degrees C.

The perm-selectivity coefficient of citrate of an anion exchange membrane is determined as:

$$T^{citrate}_{chloride} = \frac{(C''_{citrate}/C''_{chloride})}{(C'_{citrate}/C'_{chloride})}$$

where $C'_{citrate}/C'_{chloride}$ is the ratio between the concentration of citrate and chloride of the electrolyte of the reserve tank described in Tanaka 2015 and $C''_{citrate}/C''_{chloride}$ is the ratio between the concentration of citrate and chloride of the concentrate solution once the electrolyte solution of the concentrated solution has become constant.

Example 1.3: Determination of the Citrate Concentration

The concentration of citrate is measured using the test kit "Enzyplus EZA 785+, Citric Acid" of (Biocontrol, Italy), which contains the following kit components:

R1: (Lyophilized) Glycylglycine Buffer, ZnCl2, NADH, L-MDH, L-LDH, sodium azide (0.1%) as preservative. To be reconstituted.
R2: (Powder) Citrate Lyase (13 U). To be reconstituted.
R3: (1 mL) Citric Acid Standard Solution (0.30 g/L). Ready to use.

The method employs UV absorption for determination of citrate.

The amount citrate is provided in weight percent relative to the total weight of the original sample.

Principle of the Analysis:

Citrate it converted to oxaloacetate and acetate in the following reaction catalysed by the enzyme citrate lyase (CL), see reaction (1):

$$\text{Citrate} + CL \Rightarrow \text{oxaloacetat} + \text{acetate} + CL \quad (1)$$

The enzymes L-malate dehydrogenase (L-MDH) and L-acetate dehydrogenase (L-LDH) reduce oxaloacetate and its decarboxylation derivative pyruvate to L-malate and L-lactate by reduction of nicotinamide-adenine dinucleotide (NADH), see reactions (2, 3)

$$\text{Oxaloacetate} + NADH + H^+ + L\text{-LDH} \rightarrow L\text{-malate} + NAD^+ \quad (2)$$

$$\text{Pyruvate} + NADH + H^+ L\text{-MDH} \rightarrow L\text{-lactate} + NAD^+ \quad (3)$$

The amounts of oxidized NADH from reactions (2) og (3) corresponds stoechiometrically to the amount of citrate in the initial sample. The concentration of NADH is determined by its absorbance at the wavelength 340 nm.

Samples Pre-Treatment:

1 g powder to be tested is transferred to a 150 mL beaker. The precise weight ($m_{original\ sample}$) of the powder sample in gram is noted with 4 digits. If the sample is a liquid sample, a sample volume corresponding to 1 g total solids is used and the precise amount of total solids is noted as $m_{original\ sample}$.

20 mL 1 M perchloric acid is added and the sample and the mixture placed under moderate stirring for 5 minutes.

40 mL ultrapure water is added and the pH is adjusted to 10.0 by 2M KOH-solution. The mixture is then transferred to a 100 mL volumetric flask washing the beaker with ultrapure water and ultrapure water is added to the volumetric flask to reach a liquid volume of 100 mL. If a fat layer is formed, the fat layer should be above the 100 mL mark of the volumetric flask. The volumetric flask is closed and shaken to mix its contents thoroughly.

The volumetric flask is placed under refrigeration for 20 minutes to make the fat phase separate from the remaining liquid and the mixture is then subjected to filtration. The initial mL of liquid that passes the filter is discarded but the remaining filtration is collected for subsequent analysis and is referred to as the diluted sample.

Enzymatic Reaction and Absorbance Measurements:

Enzymatic reaction and absorbance measurements are performed according to the following table. Note that the term "sample" in the table refers to the "diluted sample):

| Pipette into covette | BLANK | SAMPLE |
|---|---|---|
| Distilled Water | 2.000 mL | 1.800 mL |
| R1 (Buffer solution rec.) | 1.000 mL | 1.000 mL |
| Sample (or control) | — | 0.200 mL |
| Mix[1], read the absorbances of the solutions ($A_1$) after approx. 3 min and then add: | | |
| R2 (CL) | 0.020 mL | 0.020 mL |
| Mix[1] and read the absorbencies of the solutions ($A_2$) after approx. 10 min. If the reaction has not | | |

-continued

| Pipette into covette | BLANK | SAMPLE |
|---|---|---|
| stopped after 15 min, continue to read the absorbances at 2 min. intervals until the values remain the same over 2 min$^2$. | | |

[1]For example with a plastic spatula or by gentle inversion after closing the cuvette with Parafilm ®
[2]The reaction has stopped when the absorbance is constant, continue to read the absorbencies until their values increase constantly over 2 minutes. If the absorbance continues to increase, this may be due to effects of colour compounds or enzymes in the sample. These interfering substances may be removed during sample preparation.

Calculations:

Determine the absorbance difference ($A_1$-$A_2$) for both blank and sample. Subtract the absorbance difference of the blank from the absorbance difference of the sample, thereby obtaining $\Delta A_{Citric\ Acid}$.

$$\Delta A_{CitricAcid} = (A_1-A_2)\text{sample or standard} - (A_1-A_2)\text{blank}$$

The value of $\Delta A_{Citric\ Acid}$ should as a rule be at least 0.100 absorbance units to achieve sufficiently accurate results.

The concentration of citrate of the diluted sample, $C_{diluted\ sample}$, can be calculated as follows:

$$C_{diluted\ sample} = ((V*MW)/(\varepsilon*d*v*1000))*\Delta A_{CitricAcid}\ [g/L]$$

Where:
V=Final Volume (mL) [3.02 mL]
v=Volume of diluted sample (mL) [0.02 mL]
MW=Molecular weight of Citric Acid [192.10 g/mol]
$\varepsilon$=extinction coefficient of NADPH at 340 nm=6.3[I× mmol$^{-1}$×cm$^{-1}$]
d=light path (cm) [1 cm]
It follows that:

$$C_{diluted\ sample} = (3.02\times192.10)/(6.3\times1\times0.2\times1000))\times \Delta A_{CitricAcid}[g/L] = 0.4604\times \Delta A_{CitricAcid}[g/L]$$

The concentration (% w/w) of citrate of the original sample, $C_{original\ sampler}$ is determined by the following formula:

$$C_{original\ sample}[\%\ w/w] = (0.46\times\Delta A_{CitricAcid})/m_{original\ sample})$$

The determination of citrate is always performed in duplicates.

Example 1.5: Determination of the Total Amount of Protein

The total protein content (true protein) of a sample is determined by:
1) Determining the total nitrogen of the sample following ISO 8968-1/2|IDF 020-1/2—Milk Determination of nitrogen content—Part 1/2: Determination of nitrogen content using the Kjeldahl method.
2) Determining the non-protein nitrogen of the sample following ISO 8968-4|IDF 020-4—Milk—Determination of nitrogen content—Part 4: Determination of non-protein-nitrogen content.
3) Calculating the total amount protein as ($m_{total\ nitrogen}$ − $m_{non-protein-nitrogen}$)*6.38.

Example 1.6: Determination of the Amount of Casein

The amount of casein is determined according to ISO 17997-1:2004, Milk—Determination of casein-nitrogen content—Part 1: Indirect method (Reference method).

Example 1.7: Determination of the Amount of Milk Serum Protein

The amount of milk serum protein (or whey protein) of a sample is calculated as the amount of total protein minus the amount of casein.

Example 2: Processing of Organic Skimmed Milk

Milk Feed:
1200 kg pasteurized (73° C./15 sec), organic skimmed milk (the milk feed) is preheated to 52° C. The pH of the milk feed is 6.7.

Microfiltration:
The preheated milk feed is subjected to microfiltration (MF), in batch mode, on a polymeric FR membrane from Synder Filtration (USA), which has a pore size of 800 kDa, at 50 degrees C. and with the transmembrane pressure (TMP) 0.45 bar. After collection of 720 liter permeate, diafiltration starts by adding reverse osmosis (RO) filtered tap water to the retentate at the same flow rate as the flow rate of the MF permeate. After adding 3.000 liter RO filtered tap water, the filtration is finish. 480 kg MF retentate and 3.720 kg MF permeate is collected. 98% of the lactose and 79% of the milk serum protein from the milk feed is collected in the MF permeate and 97% of micellar casein from the milk feed is collected in the MF retentate.

Nanofiltration:
The MF permeate is concentrated by nanofiltration (NF) and subjected to NF/diafiltration in batch mode at 10° C. on a NF245 membrane from DOW Chemical using a TMP of 19 bar. After collection of 3.000 liter NF permeate, diafiltration starts by adding RO filtered tap water to the NF retentate at the same flow rate as the NF permeate flow rate. After adding 1.420 liter RO filtered tap water, the diafiltration is finished. The diafiltrated NF retentate is finally concentrated to provide 360 kg NF retentate. The concentrated NF retentate contains 97% of the Lactose and 66% of the milk serum protein from the milk feed. During the NF/DIA process, approx. 86% of the monovalent ions (Na, K, and Cl) and 13% of the polyvalent ions (Ca, Mg and P) of the MF permeate are transferred to the NF permeate. The pH of the NF retentate is approx. 6.7.

Reduction of Inorganic Polyvalent Ions:
The NF retentate is then heated to 65° C. and held at this temperature for 40 min, after which it is cooled to 10° C. This heat treatment causes calcium and magnesium salts to precipitate and the precipitated salts are removed by MF filtration, in a batch mode, at 10° C. on a Ceramic 1.4 my membrane from Tami with integrated TMP gradient. When 330 liter permeate has been collected, the retentate is diafiltered with 30 liter RO filtered tap water which is added at the same flow rate as the permeate flow rate. 360 kg MF permeate is collected in total (referred to as demineralized NF retentate) and 30 kg MF retentate. 97% of lactose and 66% of milk serum protein from the milk feed is collected in the demineralised NF retentate. During the MF filtration, approx. 44% of the polyvalent ions (Ca, Mg and P) are transferred into to the MF retentate.

Preparing an Organic Infant Formula Product:
The 360 kg demineralised NF retentate is mixed with 202 kg organic skimmed milk and 36.3 kg organic vegetable fat mix. This blend is pasteurized, evaporated and spray dried to produce 128 kg final organic Infant Formula powder with a milk serum protein/casein proportion of 62/38 and an energy content of 2130 kj pr 100 gr powder. The compositions of milk feed, clarified NF retentate and Infant Formula is shown in Table 1

TABLE 1

Compositions of milk feed, demineralized NF retentate, and Infant Formula

| Component | Unit | Milk feed | Demineralised NF retentate | Infant Formula |
|---|---|---|---|---|
| Protein | % | 3.4 | 2.0 | 11.3 |
| Casein protein | % | 2.6 | 0.1 | 4.3 |
| Milk serum protein | % | 0.9 | 1.9 | 7.0 |
| NPN*6.25 | % | 0.2 | 0.2 | 0.8 |
| Lactose | % | 4.8 | 15.6 | 51.4 |
| Fat | % | <0.1 | <0.1 | 28.3 |
| Ash | % | 0.7 | 0.5 | 2.6 |
| Dry Matter | % | 9.3 | 18.6 | 97.0 |
| Calcium | % | 0.12 | 0.08 | 0.42 |
| Magnesium | % | 0.01 | 0.01 | 0.05 |
| Phosphorus | % | 0.09 | 0.08 | 0.38 |
| Sodium | % | 0.05 | 0.02 | 0.13 |
| Potassium | % | 0.16 | 0.06 | 0.43 |
| Chlorine | % | 0.10 | 0.04 | 0.28 |

Typically, further organic functional ingredients such as e.g. vitamins, nucleotides, oligosaccharides and poly-unsaturated fatty acids (PUFA) etc. are added to the infant formula.

Preparing an Organic Milk Calcium Phosphate Product:

The 30 kg MF retentate obtained from the step of reducing inorganic polyvalent ions is evaporated and spray dried to give 1.1 kg of an organic milk mineral product containing a considerable amount of calcium, magnesium and phosphorus. This product can be used to enrich all types of organic foods with milk minerals, and particularly with calcium, magnesium and phosphorus.

Example 3: Processing of Concentrated, Organic Skimmed Milk

Milk Feed:

500 kg pasteurized (73° C./15 sec), organic concentrated skimmed milk containing 6.4% (w/w) protein, 4.7% (w/w) lactose and 0.1% (w/w) fat and 12.5% (w/w) total solids (the milk feed) is preheated to 52 degrees C. The pH of the milk feed is 6.7.

Microfiltration:

The preheated milk feed is subjected to microfiltration (MF), in batch mode, on a polymeric FR membrane from Synder Filtration (USA), which has a pore size of 800 kDa, at 50 degrees C. and with the transmembrane pressure (TMP) 0.45 bar. After collection of a 100 liter permeate, diafiltration starts by adding reverse osmosis (RO) filtered tap water to the retentate at the same flow rate as the flow rate of the MF permeate. After adding 3.000 liter RO filtered tap water, the filtration is finished. 400 kg MF retentate and 3.100 kg MF permeate is collected. 96% of the lactose and 78% of the milk serum protein from the milk feed is collected in the MF permeate and 98% of micellar casein from the milk is collected in the MF retentate.

Nanofiltration:

The MF permeate is concentrated by nanofiltration (NF) and subjected to NF/diafiltration in batch mode at 10° C. on a NF245 membrane from DOW Chemical using a TMP of 19 bar. After collection of 2.790 liter NF permeate, diafiltration starts by adding RO filtered tap water to the NF retentate at the same flow rate as the NF permeate flow rate. After adding 775 liter RO filtered tap water, the diafiltration is finished. The diafiltrated NF retentate is finally concentrated to provide 155 kg NF retentate. The concentrated NF retentate contains 95% of the Lactose and 72% of the milk serum protein from the milk feed. During the NF/DIA process, approx. 78% of the monovalent ions (Na, K, and Cl) and approx. 11% of the polyvalent ions (Ca, Mg and P) of the MF permeate are transferred to the NF permeate. The pH of the NF retentate is approx. 6.7.

Reduction of Inorganic Polyvalent Ions:

The concentrated NF retentate is then heated to 65° C. and held at this temperature for 40 min, after which it is cooled to 10° C. This heat treatment causes calcium and magnesium salts to precipitate and the precipitated salts are removed by MF filtration, in a batch mode, at 10° C. on a Ceramic 1.4 my membrane from Tami with integrated TMP gradient. When 140 liter permeate has been collected, the retentate is diafiltered with 15 liter RO filtered tap water which is added at the same flow rate as the permeate flow rate. 155 kg MF permeate (referred to as demineralized NF retentate) and 15 kg MF retentate are collected in total. 94% of lactose and 72% of milk serum protein from the milk feed are collected in the demineralised NF retentate. During the MF filtration, approx. 54% of the polyvalent ions (Ca, Mg and P) are transferred into the MF retentate.

Preparing an Infant Formula Product:

The 155 kg demineralised NF retentate is mixed with 42 kg skimmed milk, 17.6 kg vegetable fat mix and 8.1 kg GOS syrup with 71% Dry Matter. This blend is pasteurized, evaporated and spray dried to produce 60 kg final Infant Formula powder with a milk serum protein/casein proportion of 81/19 and an energy content of 2160 kj pr 100 gr powder. The compositions of skimmed milk, milk feed, demineralized NF retentate and Infant Formula is shown in table 2

TABLE 2

Compositions of skimmed milk, milk feed, demineralized NF retentate, and Infant Formula

| Component | Unit | Milk feed | Skimmed milk | Demineralised NF retentate | Infant Formula |
|---|---|---|---|---|---|
| Protein | % | 6.4 | 3.2 | 3.6 | 11.7 |
| Casein protein | % | 4.9 | 2.4 | 0.2 | 2.1 |
| Milk serum protein | % | 1.5 | 0.8 | 3.5 | 9.6 |
| NPN*6.25 | % | 0.2 | 0.2 | 0.2 | 0.6 |
| Lactose | % | 4.7 | 4.6 | 14.3 | 45.2 |
| Fat | % | 0.1 | <0.1 | <0.1 | 29.3 |
| Ash | % | 1.0 | 0.7 | 0.6 | 2.0 |
| Dry Matter | % | 12.5 | 8.8 | 19.0 | 97.0 |
| Calcium | % | 0.20 | 0.12 | 0.11 | 0.36 |
| Magnesium | % | 0.02 | 0.01 | 0.01 | 0.04 |
| Phosphorus | % | 0.14 | 0.09 | 0.09 | 0.30 |
| Sodium | % | 0.05 | 0.05 | 0.03 | 0.12 |
| Potassium | % | 0.17 | 0.16 | 0.10 | 0.37 |
| Chlorine | % | 0.11 | 0.10 | 0.06 | 0.24 |
| GOS | | | | | 4.8 |

Typically, further organic functional ingredients such as e.g. vitamins, nucleotides and poly-unsaturated fatty acids (PUFA) etc. are added to the infant formula.

Preparing an Organic Milk Calcium Phosphate Product:

The 15 kg MF retentate obtained from the step of reducing inorganic polyvalent ions is evaporated and spray dried to give 0.7 kg of an organic milk mineral product containing a considerable amount of calcium, magnesium and phosphorus. This product can be used to enrich all types of organic foods with milk minerals, and particularly with calcium, magnesium and phosphorus.

Conclusion:

Both from Examples 2 and 3 it is concluded that the combination of microfiltration, nanofiltration and subsequent removal of inorganic, polyvalent ions by (e.g. mineral precipitation) surprisingly provides and efficient alternative to the combination of microfiltration, ultrafiltration, and nanofiltration. Basically, the present invention makes it possible to avoid separating the milk saccharide from the milk serum protein in the milk serum protein-containing stream that follows the microfiltration step and a much simpler process is therefore obtained.

Example 4: Preparation of an Organic, Low Mineral-Lactose Concentrate (LMLC)

The present example describes the production of an organic, low mineral, lactose concentrate (LMLC) which is used in Example 5.

Milk Source:

2.000 kg pasteurized (73° C./15 sec) organic skimmed milk (the milk source) is preheated to 10° C. The pH of the milk source is 6.7.

The preheated milk source is subjected to ultrafiltration (UF), in batch mode, on a polymeric GR73PE membrane from Alfa Laval (Denmark), which has a pore size of 10 kDa, at 10° C. and with the transmembrane pressure (TMP) 4.0 bar. After collection of 1000 liter UF permeate, the filtration is finished. 1.000 kg UF retentate and 1.000 kg UF permeate is collected. 49% of the lactose and 45% of the NPN from the milk source are collected in the UF permeate and >99% of casein and milk serum protein from the milk source are collected in the UF retentate.

The protein-free UF permeate is concentrated by nanofiltration (NF) and subjected to NF/diafiltration in batch mode at 10° C. on a NF245 membrane from DOW Chemical using a TMP of 19 bar. After collection of 730 liter NF permeate, diafiltration starts by adding RO filtered tap water to the NF retentate at the same flow rate as the NF permeate flow rate. After adding 3.000 liter RO filtered tap water, the diafiltration is finished. The diafiltrated NF retentate is finally concentrated to provide 270 kg NF retentate. The pH of the NF retentate is approx. 6.7. The concentrated NF retentate contains 98% of the lactose and 48% of the NPN from the UF permeate. During the NF/DIA process, approx. 73% of the monovalent ions (Na, K, and Cl) and approx. 10% of the polyvalent ions (Ca, Mg and P) of the UF permeate are transferred to the NF permeate.

The concentrated NF retentate is then heated to 80° C. and held at this temperature for 45 minutes, after which it is cooled to 10 degrees C. This heat treatment causes calcium and magnesium salts to precipitate and the precipitated salts are removed by MF filtration, in a batch mode, at 10° C. on a Ceramic 1.4 my membrane from Tami with integrated TMP gradient. When 240 liter permeate has been collected, the retentate is diafiltered with 30 liter RO filtered tap water which is added at the same flow rate as the permeate flow rate. 270 kg MF permeate is collected in total (referred to as low mineral lactose concentrate (LMLC)). 98% of lactose and 45% of NPN from the UF permeate is collected in the LMLC. During the MF filtration approx. 61% of the polyvalent ions (Ca, Mg and P) are transferred into to the MF retentate.

Use of LMLC in Infant Formula:

This LMLC can be used as a lactose source in infant formulas, due to its low mineral content and high lactose of dry matter on 93%. The compositions of the milk source (organic skimmed milk) and LMLC is shown in table 3.

TABLE 3

Compositions of milk feed and demineralized NF retentate

| Component | Unit | Skimmed milk | LMLC |
|---|---|---|---|
| Protein | % | 3.4 | 0.3 |
| Casein protein | % | 2.6 | <0.1 |
| Milk serum protein | % | 0.9 | <0.1 |
| NPN*6.25 | % | 0.2 | 0.3 |
| Lactose | % | 4.8 | 17.1 |
| Fat | % | <0.1 | <0.1 |
| Ash | % | 0.7 | 0.4 |
| Dry Matter | % | 9.2 | 18.3 |
| Calcium | % | 0.12 | 0.03 |
| Magnesium | % | 0.01 | <0.01 |
| Phosphorus | % | 0.09 | 0.08 |
| Sodium | % | 0.05 | 0.04 |
| Potassium | % | 0.16 | 0.14 |
| Chlorine | % | 0.10 | 0.09 |

Example 5: Preparation of an Infant Formula Product

Preparing an Infant Formula Product:

The 157 kg LMCL from Example 4 is mixed with 80 kg milk feed from Example 3 (casein source), 155 kg demineralized NF retentate from Example 3 and 27.3 kg vegetable fat. This blend is pasteurized, evaporated and spray dried to produce 99 kg final Infant Formula powder with a milk serum protein/casein proportion of 63/37 and an energy content of 2145 kj pr 100 gr powder. The compositions of the milk feed from Example 2, demineralized NF retentate from Example 3, LMLC from example 4 and Infant Formula is shown in table 4.

TABLE 4

Compositions of milk feed, demineralized NF retentates and Infant Formula

| Component | Unit | Concentrated milk feed (Ex. 3) | Low mineral lactose-concentrate (Ex. 4) | Demineralized NF retentate (Ex. 3) | Infant Formula |
|---|---|---|---|---|---|
| Protein | % | 6.3 | 0.3 | 3.6 | 11.2 |
| Casein Protein | % | 4.8 | <0.1 | 0.2 | 4.1 |
| Milk serum protein | % | 1.5 | 0.3 | 3.5 | 7.1 |
| NPN*6.25 | % | 0.2 | 0.3 | 0.2 | 0.9 |
| Lactose | % | 4.7 | 17.1 | 14.3 | 53.3 |
| Fat | % | 0.1 | <0.1 | <0.1 | 27.6 |
| Ash | % | 1.0 | 0.4 | 0.6 | 2.3 |
| Dry Matter | % | 12.5 | 18.31 | 19.0 | 97.1 |
| Calcium | % | 0.20 | 0.02 | 0.11 | 0.36 |
| Magnesium | % | 0.02 | <0.01 | 0.01 | 0.04 |
| Phosphorus | % | 0.14 | 0.08 | 0.09 | 0.38 |
| Sodium | % | 0.05 | 0.04 | 0.03 | 0.16 |
| Potassium | % | 0.17 | 0.14 | 0.10 | 0.51 |
| Chlorine | % | 0.11 | 0.09 | 0.06 | 0.33 |

Typically, further functional ingredients, such as e.g. vitamins, nucleotides, oligosaccharides and poly-unsaturated fatty acids (PUFA) etc., are added to the infant formula.

Conclusion:

From this example and Example 4, it can be concluded that low mineral nutritional products, such as infant formulas, can be produced efficiently by combining concentrated skimmed milk (from Example 3), low mineral lactose concentrate (from Example 4) and the demineralized NF retentate (from Example 3).

Example 6: Preparation of an Organic Infant Formula Ingredient

Preparing an Organic Ingredient for Use in Organic Infant Formula Products:

218 kg milk feed from Example 2 is mixed with 360 kg demineralized NF retentate from Example 2. The mix is evaporated, pasteurized and spray dried to give 92 kg organic Infant Formula Ingredient with a milk serum protein/casein proportion of 60/40, which can be used to produce a final Infant Formula product by adding vegetable fat and/or cream to the ingredient. The composition of the milk feed, the demineralized NF retentate and the Infant Formula Ingredient is shown in table 5.

TABLE 5

Compositions of milk feed, demineralized NF retentate, and Infant Formula Ingredient

| Component | Unit | Milk feed | Demineralised NF retentate | Infant Formula Ingredient |
| --- | --- | --- | --- | --- |
| Protein | % | 3.5 | 2.1 | 16.4 |
| Casein protein | % | 2.6 | 0.1 | 6.6 |
| Milk serum protein | % | 0.9 | 2.0 | 9.9 |
| NPN*6.25 | % | 0.2 | 0.2 | 1.2 |
| Lactose | % | 4.8 | 15.6 | 72.2 |
| Fat | % | <0.1 | <0.1 | 0.1 |
| Ash | % | 0.7 | 0.5 | 3.7 |
| Dry Matter | % | 9.3 | 18.7 | 95.0 |
| Calcium | % | 0.12 | 0.08 | 0.60 |
| Magnesium | % | 0.01 | 0.01 | 0.07 |
| Phosphorus | % | 0.09 | 0.08 | 0.54 |
| Sodium | % | 0.05 | 0.02 | 0.20 |
| Potassium | % | 0.16 | 0.06 | 0.62 |
| Chlorine | % | 0.10 | 0.04 | 0.40 |

Conclusion:

From this example, it is concluded that a combination of the demineralized NF retentate (an example of a demineralized, milk saccharide-containing milk serum protein product according to the present invention) and a casein source (e.g. skimmed milk) are attractive ingredients for the production of nutritional products such as e.g. infant formula products.

Example 7: Preparation of a Demineralised, Milk Saccharide-Containing Milk Serum Protein Product Preparing an Ingredient for Use in Infant Formula Products:

155 kg demineralized NF retentate from Example 3 is pasteurized, evaporated and spray dried to give 30 kg demineralized, milk saccharide-containing milk serum protein product t with a milk serum protein/casein proportion of 95:5, which can be used to produce a final Infant Formula product by adding a casein source, vegetable fat and/or cream to the ingredient. The composition of the demineralized NF retentate and the Infant Formula Ingredient are shown in table 6.

TABLE 6

Compositions of milk feed, demineralized NF retentate, and Infant Formula Ingredient

| Component | Unit | Demineralised NF retentate | Demineralised, milk saccharide-containing milk serum protein product |
| --- | --- | --- | --- |
| Protein | % | 3.7 | 18.5 |
| Casein protein | % | 0.2 | 0.8 |
| Milk serum protein | % | 3.5 | 17.6 |
| NPN*6.25 | % | 0.2 | 0.9 |
| Lactose | % | 14.3 | 71.5 |
| Fat | % | <0.1 | <0.1 |
| Ash | % | 0.6 | 2.8 |
| Dry Matter | % | 19.0 | 95.0 |
| Calcium | % | 0.11 | 0.53 |
| Magnesium | % | 0.01 | 0.06 |
| Phosphorus | % | 0.09 | 0.46 |
| Sodium | % | 0.03 | 0.16 |
| Potassium | % | 0.10 | 0.50 |
| Chlorine | % | 0.06 | 0.32 |

Conclusion:

From this example, it is concluded that the demineralized NF retentate (an example of a demineralized, milk saccharide-containing milk serum protein product according to the present invention) as such is an attractive ingredient for the production of nutritional products such as e.g. infant formula products and other products which benefit from the combination of milk saccharides and non-denatured milk serum protein.

Example 8: Preparation of an Infant Formula Based on Organic Skimmed Milk

Milk Source:

1.500 kg pasteurized (73 degrees C./15 sec) organic skimmed milk (the milk source) was preheated to 10 degrees C. The pH of the milk source was approx. 6.7.

Concentration of the Milk Source:

The preheated milk source was concentrated by filtration in batch mode using a polymeric GR73PE membrane from Alfa Laval (Denmark), having a pore size of 10 kDa, at 10 degrees C. and with a transmembrane pressure of (TMP) 4.0 bar. After collection of 1.000 liter conc. permeate, the filtration was stopped. 500 kg conc. retentate and 1.000 kg conc. permeate were collected. 67% of the lactose and 65% of the NPN from the milk source were collected in the conc. permeate and >99% of casein and milk serum proteins from the milk source were collected in the conc. retentate.

Nanofiltration of Conc. Permeate to Purify Lactose:

The conc. permeate was concentrated by nanofiltration (NF) and subjected to NF/diafiltration in batch mode at 10 degrees C. on a NF-FF membrane from DOW Chemical using a TMP of 19 bar. The first 300 kg NF permeate was collected to be used later to dilute the conc. retentate. After collection of 440 liter NF permeate, the diafiltration was started by adding RO filtered tap water to the NF retentate at the same flow rate as the NF permeate flow rate. After adding 1.680 liter RO filtered tap water, the NF filtration was stopped and provided 560 kg NF retentate. The concentrated NF retentate contained 98% of the lactose and 47% of the NPN from the conc. permeate. During the NF/DIA process, approx. 53% of the monovalent ions (Na, K, and Cl) and approx. 5% of the polyvalent ions (Ca, Mg and P) of the conc. permeate were transferred to the NF permeate.

Further Purification of Lactose Derived from the Concentration Permeate:

The concentrated NF retentate, primarily containing water, lactose, polyvalent ions, and the remaining monovalent ions, was then heated to 80 degrees C. and held at this temperature for 45 min., after which it was cooled to 10 degrees C. This heat treatment caused salts containing phosphorus, calcium, and magnesium to precipitate, and the precipitated salts were removed by MF in a batch mode, at 10 degrees C. on a Ceramic 1.4 my membrane from Tami with integrated TMP gradient. When 520 liter permeate had been collected, the retentate was diafiltered with 40 liter RO filtered tap water which was added at same flow rate as permeate flow rate. 560 kg MF permeate (referred to as low mineral lactose concentrate, LMLC) was collected in total. 97% of lactose and 47% of NPN from the conc. permeate were collected in the LMLC. During the MF filtration, approx. 40% of the polyvalent ions (Ca, Mg and P) were removed into to the MF retentate.

Milk Feed:

The milk feed was prepared by mixing 500 kg of the above conc. retentate with 300 kg of the above NF permeate and preheating the mixture to 52 degrees C. The 800 kg milk feed contained 9.3% dry matter, including 5.6% (w/w) protein and 2.7% (w/w) lactose. The pH of the milk feed was approx. 6.7.

Microfiltration of Milk Feed:

The preheated milk feed was subjected to microfiltration (MF), in batch mode, on a polymeric FR membrane from Synder Filtration (USA), which had a pore size of 800 kDa, at 50 degrees C. and with the trans membrane pressure (TMP) 0.45 bar. After collection of 300 liter permeate, diafiltration was initiated by adding the above-mentioned NF permeate from nanofiltration of the conc. permeate to the present MF retentate at the same flow rate as the flow rate of the MF permeate. After adding 2.000 liter NF permeate, the filtration was stopped. 500 kg MF retentate and 2.300 kg MF permeate was collected. 96% of the lactose and 75% of the total serum protein of the milk feed were collected in the MF permeate and 97% of micellar casein from the milk was collected in the MF retentate.

Nanofiltration of MF Permeate:

MF permeate was concentrated by nanofiltration (NF) and subjected to NF/diafiltration in batch mode at 10 degrees C. on a NF-FF membrane from DOW Chemical as follows:

After collection of 300 liter NF permeate the NF process was started to deliver NF permeate as diluent for the MF/DIA of the milk feed with the same flow as the MF permeate flow. TMP started at 6 bar and was increased to 15 bar.

When the MF/DIA was stopped, the NF was continued to concentrate and diafilter the MF permeate. First the MF permeate was concentrated to 9% dry matter. Then the NF/diafiltration was started by adding RO filtered tap water to the NF retentate at the same flow rate as the NF permeate flow rate. After addition of 900 liter RO filtered tap water, the diafiltration was finished. The diafiltrated NF retentate was finally concentrated to provide 180 kg NF retentate. The concentrated NF retentate contained 95% of the lactose and 62% of the milk serum protein from the milk feed.

Reduction of Inorganic Polyvalent Ions in Milk Serum Protein-Containing NF Concentrate:

The concentrated NF retentate was heated to 65 degrees C. and held at this temperature for 40 min, after which it was cooled to 10 degrees C. This heat treatment caused salts of calcium, magnesium, and phosphorus to precipitate and the precipitated salts were removed by centrifugation. The obtained supernatant is referred to as the demineralized NF retentate. 94% of lactose and 61% of total serum protein from the milk feed were collected in the demineralized NF retentate, which is an example of a demineralised, milk saccharide-containing milk serum protein product according to the invention.

Preparing an Infant Formula Product:

An infant formula product may be prepared from the above product streams by mixing 180 kg demineralised NF retentate with 70 kg of the above conc. retentate (concentrated skimmed milk), 374 kg LMLC, 33.2 kg vegetable fat mix and 15.1 kg GOS syrup containing 71% Dry Matter. This blend is pasteurized, evaporated and spray dried to produce 118 kg final Infant Formula powder with a milk serum protein/casein proportion of 62/38 and an energy content of 2070 kJ pr 100 gr powder. The compositions of skimmed milk (the milk source), conc. retentate (used both as casein source for the infant formula and milk feed for the MF fractionation), LMLC, demineralized NF retentate and Infant Formula is shown in table 7

TABLE 7

Compositions of organic skimmed milk (the milk source), the conc. retentate (used both as milk feed for the MF fractionation and casein source for the infant formula), LMLC (Low Mineral Lactose Concentrate), demineralized NF retentate, and Infant Formula

| Component | Unit | Skimmed milk | Conc. retentate | LMCM | Demineralised NF retentate | Infant Formula |
|---|---|---|---|---|---|---|
| Protein | % | 3.02 | 8.97 | 0.14 | 3.60 | 11.20 |
| Casein Protein | % | 2.24 | 6.91 | <0.05 | 0.11 | 4.25 |
| Total whey Protein | % | 0.68 | 2.06 | 0.14 | 3.49 | 6.10 |
| NPN*6.25 | % | 0.17 | 0.18 | 0.14 | 0.20 | 0.85 |
| Lactose | % | 4.24 | 4.24 | 7.38 | 11.23 | 47.30 |
| Fat | % | 0.05 | 0.15 | <0.05 | <0.05 | 28.10 |
| Ash | % | 0.69 | 1.14 | 0.45 | 0.90 | 3.46 |
| Dry Matter | % | 8.07 | 14.66 | 8.84 | 16.61 | 97.00 |
| Calcium | % | 0.11 | 0.26 | 0.02 | 0.10 | 0.36 |
| Magnesium | % | 0.01 | 0.02 | 0.01 | 0.02 | 0.08 |
| Phosphorus | % | 0.08 | 0.19 | 0.05 | 0.12 | 0.44 |
| Sodium | % | 0.03 | 0.03 | 0.03 | 0.05 | 0.20 |
| Potassium | % | 0.14 | 0.16 | 0.15 | 0.26 | 0.97 |
| Chlorine | % | 0.08 | 0.07 | 0.02 | 0.03 | 0.15 |
| GOS | | | | | | 4.5 |

As mentioned above, further organic functional ingredients, such as e.g. vitamins, nucleotides, and poly-unsaturated fatty acids (PUFA), etc., are typically added to the infant formula.

Conclusion:

It has been demonstrated that an organic infant formula product may be produced by MF fractionation without the use of ultrafiltration on the milk serum protein-containing streams that follow the MF fractionation of the milk feed. It has been demonstrated that the method provides a high yield of the milk serum protein and lactose of the milk feed and still provides a sufficient degree of demineralization to be useful for producing nutritional products such as e.g. infant formulas. The reduction of polyvalent inorganic ions by mineral precipitation has proven to be particularly useful and provides a significant simplification of the method relative to prior art methods.

An even higher yield of the milk serum protein can be obtained by more MF/DIA in step b). The level of monovalent ions of the above infant formula product or the above demineralized NF retentate may also be reduced additionally by washing our more monovalent ions during the NF/DIA of step c).

Example 9: Preparation of a Low Citrate Infant Formula Based on Organic Skimmed Milk Using Electrodialysis Milk Source:

67,962 kg pasteurized (73° C./15 sec) organic skimmed milk

Preconcentration of Milk Feed by Ultrafiltration (UF)

The milk source was subjected to ultrafiltration (UF), in continuous mode, on a polymeric HFK131 membrane from Koch (USA), having a cut off value of 10 kDa, at 10° C. and with the trans membrane pressure (TMP) 3.5 bar. The degree Brix of the UF retentate was adjusted to 17.6 by a regulation valve controlled by a refractometer. 27,202 kg retentate and 41,950 kg permeate were collected; which resulted in a concentration factor (CF) on 2.53.

Concentration of UF Permeate by Nanofiltration (NFI):

The UF permeate was pH adjusted to 5.8 by $CO_2$ and concentrated by nanofiltration (NF), in continuous mode, at 10° C. on a NF245 membrane from DOW Chemical using a TMP of 19 bar.

The degree Brix of the NF retentate was adjusted to 23.0 by a regulation valve controlled by an refractometer. 7,350 kg retentate was collected and the permeate was discarded.

Demineralisation of NFI Retentate by Electrodialysis (EDI):

The NF retentate from NFI was demineralized, in batch mode, on a Electrodialysis (ED) unit P15 EWDU 1×EDR-II/250-0.8 from MEGA (Czech Republic) at 10° C. The ED unit was mounted with Ralex CM(H)-PES cation membranes and Ralex AM(H)-PES anion membranes.

The electrolyte used for electrode streams contained 15.6 g/L $NaNO_3$.

The perm-selectivity coefficient of citrate of the AM(H)-PES anion membranes was estimated to be significantly larger than 0.01.

The ED process stops when the ratio between conductivity (cm/S) and the degree Brix (conductivity divided by Brix) reached 0.034 in the diluate (product), which corresponded to a conductivity reduction of approx. 85% (from 2.78 mS to 0.424 mS). 6,615 kg demineralized NF retentate (Lactose) was collected and cooled to 6° C. The composition of the lactose, which was used for lactose standardisation in final product, can be seen in Table 8.

When the ED was stopped, the concentrate stream had the following characteristics:
Ash: 1.83% (w/w); amount of citrate: 1.61% (w/w); amount of Ca: not measured; amount of Mg: 0.054% (w/w); amount of Cl: 0.04% (w/w); amount of Na: 0.106% (w/w); amount of K: 0.331% (w/w); and amount of P: 0.14% (w/w).

The demineralized diluate (a demineralized, milk saccharide product) had been shown to typically contain 0.02 g sialyllactose/100 g.

Microfiltration (Germfiltration) of UF Retentate:

The UF retentate was preheated to 55° C. and filtered through a 1.4 micron ceramic isoflux membrane from TAMI (France), in continuous mode, at 50° C. using a TMP beginning at 0.5 bar and increasing to 0.8 bar. The microfiltration was operated with a concentration factor (CF) of 40.

27,100 kg permeate (MPC) was cooled to 6° C. and collected. The composition of the MPC, which is used as casein source in final product, can be seen in Table 8. The germ-filtered UF retentate is used as milk feed for the MF-based protein fractionation.

Protein-Fractionating Microfiltration of the Milk Feed:

27,000 kg of the cooled milk feed (the germ-filtered UF retentate) was preheated to 55° C. and subjected to microfiltration (MF), in continuous mode, using a polymeric MF membrane having a pore size of approx. 0.1 micron and a narrow pore size distribution, at 50° C. and with the trans membrane pressure (TMP) at 0.45 bar. 500% diafiltration water was added during the continuous filtration in the 4 loops filtration plant. The CF was 1.0 during the filtration. 27,500 kg MF retentate was cooled to 6° C. and collected. This retentate contained>99% of the micellar casein proteins and 20% of the globular whey proteins from the germ filtered UF retentate. The permeate was cooled to 10° C. and concentrated simultaneous as described in next section.

Concentration of MF Permeate by Nanofiltration (NFII):

The MF permeate was concentrated by nanofiltration (NF), in continuous mode, at 10° C. on a NF245 membrane from DOW Chemical using a TMP of 19 bar. The degree Brix of the NF retentate was adjusted to 27.0 by an regulation valve controlled by an refractometer. 5,450 kg retentate was collected and the permeate was heated to 50° C. and used as diafiltration water in the previous MF section. Excess permeate was discarded.

Demineralisation of NFII Retentate by Electrodialysis (EDII):

The NF retentate from NFII was demineralized, in batch mode, on an Electrodialysis (ED) unit P15 EWDU 1×EDR-II/250-0.8 at 10° C. The ED unit was mounted with Ralex CM(H)-PES cation membranes and Ralex AM(H)-PES anion membranes. The ED process stopped when ratio between the conductivity and the degree Brix reached 0.028 in the diluate (product), which corresponded to approx. 82% conductivity reduction (from 3.02 mS/cm to 0.541 mS/cm). 4,905 kg demineralized NF retentate (demineralised, milk saccharide-containing milk serum protein concentrate, SPC) was collected and cooled to 6° C. The composition of the SPC, which was used for whey protein source in the final product, can be seen in Table 8.

The SPC had been shown typically to contain 0.02 g sialyllactose/100 g.

When the ED was stopped, the concentrate stream had the following characteristics: Ash: 1.45% (w/w); amount of citrate: 1.3% (w/w); amount of Ca: 0.286% (w/w); amount of Mg: 0.05% (w/w); amount of Cl: not measured; amount of Na: 0.127% (w/w); amount of K: 0.19% (w/w); and amount of P: 0.073% (w/w).

Preparing an Liquid Infant Formula Base Product:

10.0 kg demineralised NFII retentate (SPC), 4.5 kg germfiltered UF retentate (MPC) and 8.5 kg demineralised NFI retentate (Lactose) is mixed by gentle stirring in a 50 l stainless steel vessel. This blend can be used as an infant base formulation, because it contains all casein proteins, whey proteins and lactose needed in an Infant formulation with 65% whey of protein and 60% of all dry matter in the infant formulation. The composition of the liquid infant formula base product is shown in Table 8.

Preparing an Powder Infant Formula Base Product:

5.0 kg of the liquid infant formula base product is freeze-dried on a Telstar, Lyobeta Micrositelab 3.0 freeze drier resulting in 1.0 kg powder. The composition of the powder infant formula base product is shown in Table 8.

TABLE 8

Chemical composition of 3 ingredients (Lactose, MPC and WPC) and infant formula base blend as liquid and powder

|  | Unit | Lactose NFI ret | MPC UF ret | SPC NFII ret | Infant formula base Liquid | Infant formula base Powder |
|---|---|---|---|---|---|---|
| Protein | g/100 g | 0.25 | 8.18 | 4.69 | 3.76 | 18.63 |
| Casein | g/100 g | 0.00 | 6.54 | 0.00 | 1.32 | 6.52 |
| Serum protein | g/100 g | 0.25 | 1.64 | 4.69 | 2.44 | 12.11 |
| Serum protein relative to total protein | g/100 g | 100 | 20 | 100 | 65 | 65 |
| Lactose | g/100 g | 19.35 | 4.81 | 15.72 | 15.10 | 74.21 |
| Fat | g/100 g | <0.04 | 0.12 | <0.04 | <0.04 | 0.12 |
| Dry Matter | g/100 g | 20.21 | 14.51 | 21.19 | 19.44 | 96.00 |
| Ash | g/100 g | 0.19 | 1.16 | 0.15 | 0.35 | 1.85 |
| pH |  | 5.54 | 6.68 | 6.00 | 6.43 | 6.58 |
| Citrate | g/100 g | 0.16 | 0.23 | 0.17 | 0.17 | 0.81 |
| Calcium | g/100 g | 0.031 | 0.249 | 0.054 | 0.087 | 0.411 |
| Magnesium | g/100 g | 0.007 | 0.017 | 0.011 | 0.011 | 0.053 |
| Chloride | g/100 g | 0.04 | 0.08 | 0.04 | 0.04 | 0.08 |
| Sodium | g/100 g | 0.010 | 0.036 | 0.014 | 0.017 | 0.080 |
| Potassium | g/100 g | 0.012 | 0.165 | 0.013 | 0.043 | 0.207 |
| Phosphorus | g/100 g | 0.029 | 0.177 | 0.027 | 0.059 | 0.280 |
| Copper | mg/kg | <0.1 | <0.1 | <0.1 | <0.1 | 0.26 |
| Zinc | mg/kg | <0.5 | 9.6 | <0.5 | 1.8 | 12.0 |
| Iodine | mg/kg | <0.05 | 0.16 | <0.05 | <0.05 | <0.05 |
| Selenium | mg/kg | <0.005 | 0.035 | 0.018 | 0.015 | 0.035 |
| Molybdenum | mg/kg | 0.006 | 0.073 | 0.107 | 0.062 | 0.327 |
| Manganese | mg/kg | <0.1 | <0.1 | <0.1 | <0.1 | <0.1 |
| Urea | mg/100 g | 15.3 | 18.5 | 7.0 | 11.9 | 55.6 |
| Vitamin B2 | mg/100 g | 0.40 | 0.25 | 0.616 | 0.497 | 2.06 |
| Vitamin B5 | mg/100 g | 1.02 | 0.44 | 0.23 | 0.56 | 2.80 |
| Vitamin B6 | mg/100 gr | 0.061 | 0.045 | 0.063 | 0.050 | 0.258 |
| Vitamin B8 | microg/100 g | <1 | <1 | <1 | <1 | 4.25 |
| Vitamin B12 | microg/100 g | <0.25 | 0.97 | 0.79 | 0.53 | 2.48 |
| Choline | mg/kg | 340 | 119 | 265 | 259 | 1310 |
| Cholesterol | mg/100 g | <1 | 11.9 | <1 | 1.2 | 4.3 |
| Myo-inositol | mg/100 g | 11.4 | 4.42 | 8.58 | 8.65 | 42.1 |
| Carnitine | mg/kg | 80.6 | 19.9 | 58.4 | 58.3 | 291 |
| Serine | g/16 g N | — | 5.76 | 4.71 | 4.95 | 4.68 |
| Glutamic acid | g/16 g N | — | 22.13 | 17.95 | 19.12 | 18.36 |
| Proline | g/16 g N | — | 9.99 | 5.01 | 6.91 | 6.87 |
| Glycine | g/16 g N | — | 1.92 | 1.92 | 1.86 | 1.81 |
| Alanine | g/16 g N | — | 3.47 | 5.14 | 4.31 | 4.11 |
| Valine | g/16 g N | — | 6.58 | 5.29 | 5.59 | 5.42 |
| Isoleucine | g/16 g N | — | 5.32 | 5.50 | 5.13 | 5.36 |
| Leucine | g/16 g N | — | 10.32 | 13.13 | 11.46 | 10.95 |
| Tyrosine | g/16 g N | — | 4.87 | 2.92 | 3.48 | 3.35 |
| Phenylalanine | g/16 g N | — | 5.06 | 3.65 | 4.18 | 4.09 |
| Lysine | g/16 g N | — | 8.84 | 11.3 | 9.65 | 9.29 |
| Histidine | g/16 g N | — | 2.90 | 2.22 | 2.34 | 2.31 |
| Arginine | g/16 g N | — | 3.58 | 2.49 | 2.69 | 2.73 |
| Asparagine acid | g/16 g N | — | 8.09 | 12.41 | 10.00 | 9.66 |
| Threonine | g/16 g N | — | 4.56 | 5.29 | 4.71 | 4.56 |
| Tryptophan | g/16 g N | — | 1.42 | 2.41 | 1.95 | 1.88 |
| Cysteine | g/16 g N | — | 0.71 | 2.69 | 1.81 | 1.93 |
| Methionine | g/16 g N | — | 2.70 | 2.35 | 2.15 | 2.47 |
| Sum | g/16 g N | — | 108.2 | 106.38 | 102.59 | 99.84 |

Conclusion:

The present inventors have seen indications that prior art infant formulas based on MF-fractionation of milk contain a surprisingly high content of citrate. The inventors have investigated the reasons for this and have found that citrate is not eliminated from serum protein streams or lactose-containing streams by NF-based demineralization unless an NF pore size is chosen that also removes lactose.

However, the inventors have found that by employing electrodialysis and selecting electrodialysis membranes that allow for the passage of not only chloride and phosphate but also citrate, citrate can be reduced without losing lactose which is a valuable carbohydrate for infant formulas. The present invention provides an efficient process of preparing low citrate infant formula bases and final infant formula having a low content of citrate and avoids separating milk saccharides from milk serum protein stream.

The invention also has the distinct advantage that variations in the content of citrate of the raw milk are reduced and the resulting infant formulas have a more stable content of citrate. Citrate has been shown to have an impact on the bioavailability of e.g. iron, calcium, magnesium and zinc (Glahn et al, Fairweather-Tait). The present invention therefore makes it possible to produce infant formulas which provide the infants with a more uniform bioavailability of the above-mentioned metal ions.

References:

| | |
|---|---|
| APV | "Membrane filtration and related molecular separation technologies", published by APV Systems, 2000, ISBN 87-88016 757 |
| Fairweather-Tait et al, | Iron and Calcium Bioavailability of Fortified Foods and Dietary Supplements, Nutrition Reviews ®, Vol. 60, No. 12, November 2002: 360-367 |
| Glahn et al, | Decreased Citrate Improves Iron Availability from Infant Formula: Application of an In Vitro Digestion/Caco-2 Cell Culture Model, J. Nutr. 128: 257-264, 1998 |
| Sata 2004 | "Ion Exchange Membranes Preparation, characterisation, modification and application", Toshikatsu Sata, The Royal Society of Chemistry, 2004, ISBN 0-85404-590-2 |
| Tanaka 2015 | "Ion exchange membranes Fundamentals and Applications", Yoshinobu Tanaka, 2$^{nd}$ edition, Elsevier, 2015, ISBN: 978-0-444-63319-4, |

The invention claimed is:

1. A method of producing a nutritional product in a form of an infant formula or an infant formula base, the method comprising the steps of:
   a) providing a milk feed comprising milk saccharide, casein micelles, and milk serum protein,
   b) subjecting the milk feed to microfiltration (MF) or microfiltration/diafiltration, thereby providing an MF retentate enriched with respect to micellar casein and an MF permeate enriched with respect to milk serum protein,
   c) subjecting the MF permeate to nanofiltration (NF) or nanofiltration/diafiltration using a membrane that allows for the passage of monovalent ions but retains milk saccharide so as to obtain an NF retentate and an NF permeate,
   d) subjecting the NF retentate to electrodialysis using an anion exchange membrane that results in a reduction of citrate, so as to obtain a demineralised, milk saccharide-containing milk serum protein product which has a reduced level of calcium, magnesium phosphorus and citrate,
   e) adding a casein source, and optionally one or more additional ingredients, to the demineralised, milk saccharide-containing milk serum protein product to obtain the nutritional product in the form of an infant formula or an infant formula base, and
   f) optionally converting the nutritional product to a powder,
and wherein: the milk serum protein-containing streams following step b) are not subjected to ultrafiltration that separates milk serum protein from milk saccharide; and a reduction of citrate is not obtained if step d) is omitted after step c).

2. The method according to claim 1, wherein the milk feed comprises a total amount of milk saccharide of in the range of 1-10% (w/w).

3. The method according to claim 1, wherein the milk feed comprises a total amount of protein in the range of 1-12% (w/w).

4. The method according to claim 1, wherein the milk feed comprises whole milk, skim milk, fat-free milk, low fat milk, full fat milk or concentrated milk.

5. The method according to claim 1, wherein step a) involves a step of ultrafiltration (UF) and optionally UF/diafiltration of a milk source thereby providing:
   a UF milk retentate, and
   a UF milk permeate, and
at least a portion of the UF milk retentate is used as the milk feed.

6. The method according to claim 1, wherein NF retentate contains:
   a total amount of sodium of at most 0.4% (w/w total solids),
   a total amount of potassium of at most 1.3% (w/w total solids), and
   a total amount of chlorine of at most 0.8% (w/w total solids).

7. The method according to claim 1, wherein the NF retentate has a pH in the range of 5.5-7.0.

8. The method according to claim 1, wherein electrodialysis comprises an anion exchange membrane having a perm-selectivity coefficient of citrate of at least 0.01.

9. The method according to claim 1, wherein the demineralised, milk saccharide-containing milk serum protein product contains one or more of the following:
   a total amount of calcium of at most 1.0% (w/w total solids),
   a total amount of magnesium of at most 0.1% (w/w total solids),
   a total amount phosphorus of at most 0.8% (w/w total solids), and
   a total amount of citrate of at most 1% (w/w total solids).

10. The method according to claim 1, wherein the casein source comprises one or more of milk, concentrated milk, dry milk, a milk protein concentrate, a beta-casein isolate, a micellar casein isolate, caseinate, an UF retentate of milk, a MF retentate of milk, or a combination thereof.

11. The method according to claim 1, wherein the demineralised, milk saccharide-containing milk serum product and the casein source is mixed so as to obtain a weight ratio between milk serum protein and casein in the range of 50:50-70:30.

12. The method according to claim 1, wherein the nutritional product is an organic product.

13. A method of producing a demineralised, milk saccharide-containing milk serum protein product the method comprising the steps of:
   i) providing a milk feed comprising milk saccharide, casein micelles, and milk serum protein,
   ii) subjecting the milk feed to microfiltration (MF) or microfiltration/diafiltration, thereby providing an MF retentate and an MF permeate,
   iii) subjecting the MF permeate to nanofiltration or nanofiltration/diafiltration so as to obtain an NF retentate and an NF permeate,
   iv) subjecting the NF retentate to electrodialysis, thereby obtaining the demineralised, milk saccharide-containing milk serum protein product containing reduced citrate,
   v) optionally, drying the demineralised, milk saccharide-containing milk serum protein product,
and wherein the milk serum protein-containing streams following step ii) are not subjected to ultrafiltration that separates milk serum protein from milk saccharide; and a reduction of citrate in the demineralized milk saccharide-containing milk serum protein product is not obtained if step iv) is omitted after step iii).

14. The method according to claim 1, wherein the demineralised, milk saccharide-containing milk serum protein product contains a total amount of citrate of at most 1% (w/w total solids).

* * * * *